United States Patent [19]

Newkirk et al.

[11] Patent Number: 4,900,699

[45] Date of Patent: * Feb. 13, 1990

[54] RESERVOIR FEED METHOD OF MAKING CERAMIC COMPOSITE STRUCTURES AND STRUCTURES MADE THEREBY

[75] Inventors: Marc S. Newkirk, Newark; H. Daniel Lesher; Ratnesh K. Dwivedi, both of Wilmington; Robert C. Kantner, Newark, all of Del.

[73] Assignee: Lanxide Technology Company, LP, Newark, Del.

[*] Notice: The portion of the term of this patent subsequent to Jan. 2, 2007 has been disclaimed.

[21] Appl. No.: 908,067

[22] Filed: Sep. 16, 1986

[51] Int. Cl.$^4$ ............................................. C04B 35/02
[52] U.S. Cl. .................................... 501/94; 501/87; 501/88; 501/96; 501/98; 501/127; 501/128; 501/134; 501/153; 423/625; 264/65; 264/57
[58] Field of Search .................... 501/87, 88, 94, 96, 501/98, 127, 128, 134, 153; 423/412, 618, 625; 264/65, 57

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 3/1966 | Bawa | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,538,231 | 11/1970 | Newkirk et al. | |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 4,626,516 | 12/1986 | Morelock | 501/98 |

FOREIGN PATENT DOCUMENTS 0116809 8/1984 European Pat. Off. .
0155831 9/1985 European Pat. Off. .
0169067 1/1986 European Pat. Off. .
85 654 7/1985 Greece .

OTHER PUBLICATIONS

"Oxidation of Molten Aluminum Alloys. Reaction with Refractories"-M. Drouzy and M. Richard—Mar., 1974–Fonderie, France, No. 332, pp. 121–128.
"Refractories for Aluminum Alloy Melting Furnaces'-'-B. Clavaud and V. Jost—Sep., 1980–Lillian Brassinga (from French) Jan., 1985.

Primary Examiner—William R. Dixon, Jr.
Assistant Examiner—Andrew Griffis
Attorney, Agent, or Firm—Mark G. Mortenson; William E. McShane; Michael K. Boyer

[57] ABSTRACT

A method for producing a self-supporting ceramic composite structure, which includes a ceramic matrix embedding a filler, includes oxidizing a parent metal to form a polycrystalline material comprising the oxidation reaction product of the parent metal with an oxidant and, optionally, one or more metallic constituents, and the filler embedded by the matrix. The method includes heating a first source of molten parent metal and a reservoir source of molten parent metal and contacting the first source of molten parent metal with a permeable bedding of filler. The first source of molten parent metal is reacted with the oxidant to form the oxidation reaction product and is replenished from the reservoir as the reacting continues for a time sufficient to grow the oxidation reaction product to a desired extent and thereby embed at least a portion of the bedding of filler within the oxidation reaction product to form the ceramic composite structure. The bedding of filler may have any suitable shape, including that of a hollow body, the interior of which is contacted by the first source of molten parent metal to grow the oxidation reaction product through the shaped, hollow body of filler.

27 Claims, 7 Drawing Sheets

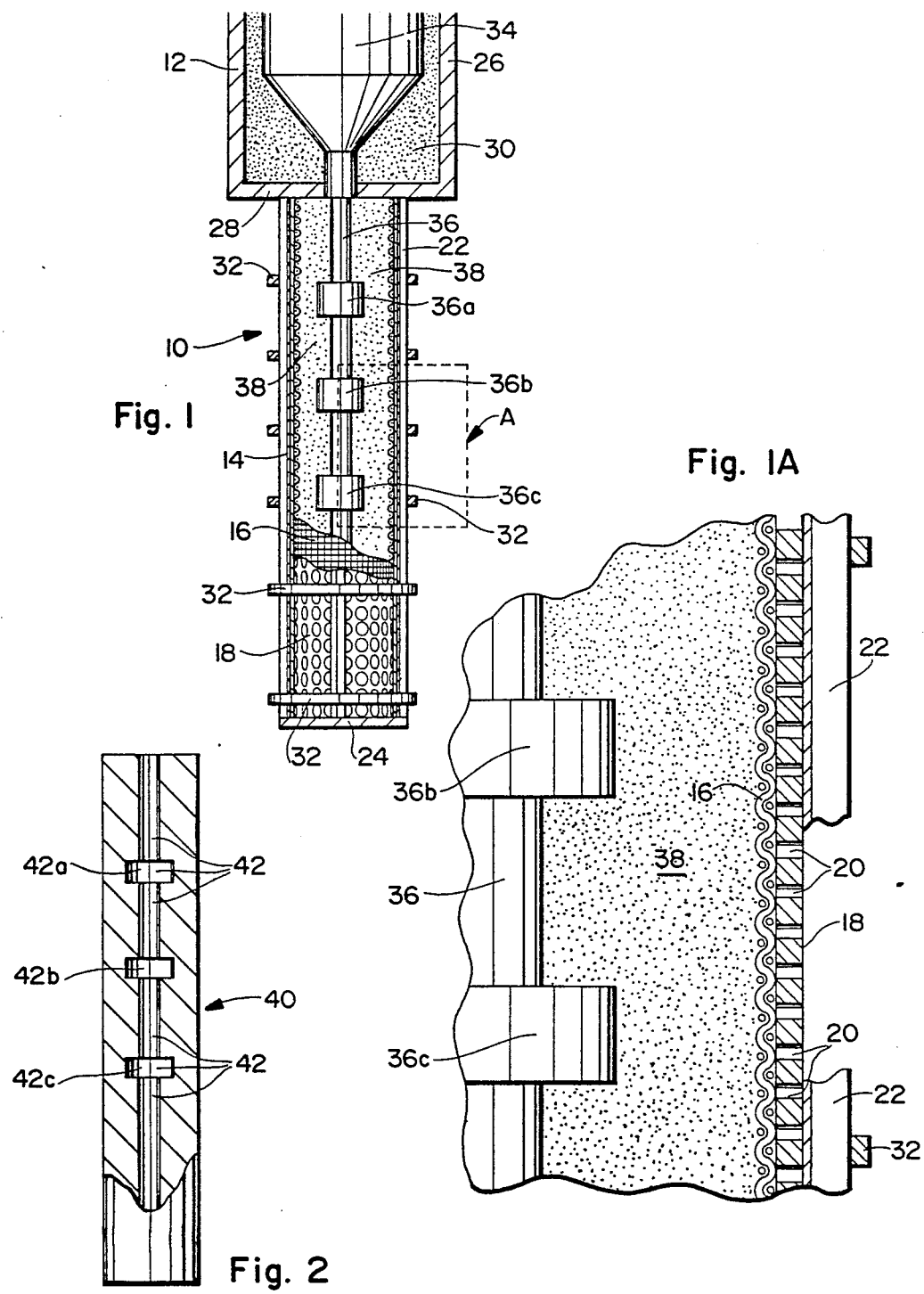

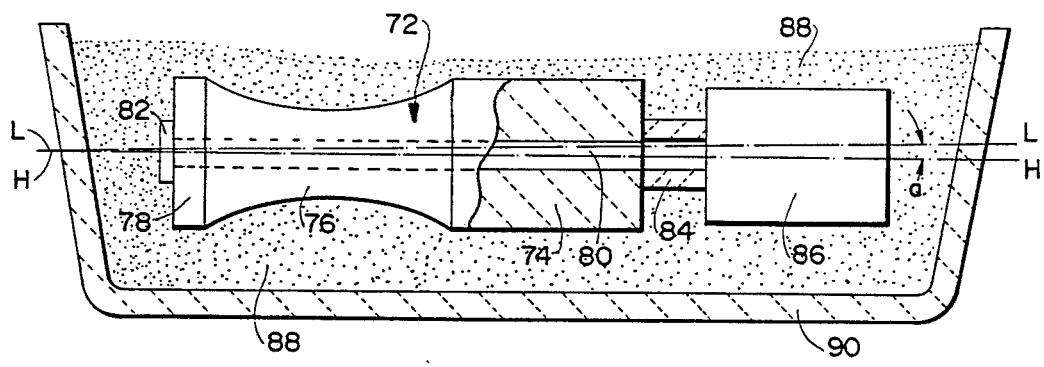
Fig. 6
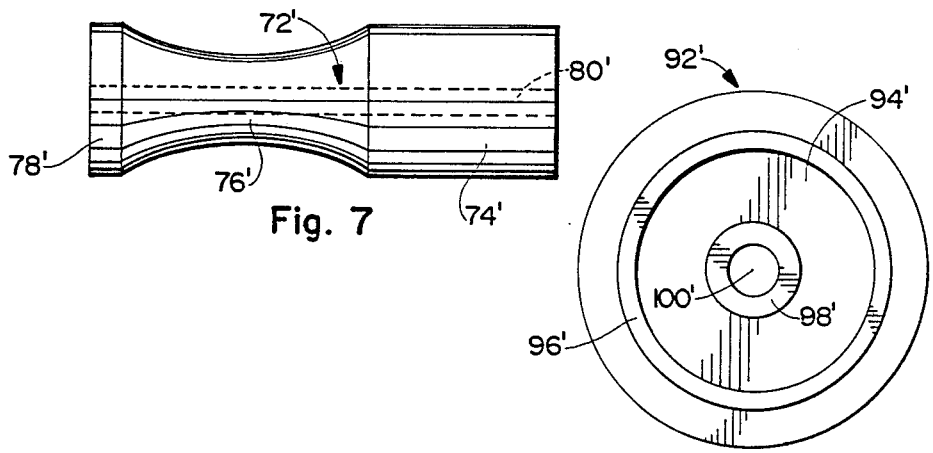
Fig. 7
Fig. 9
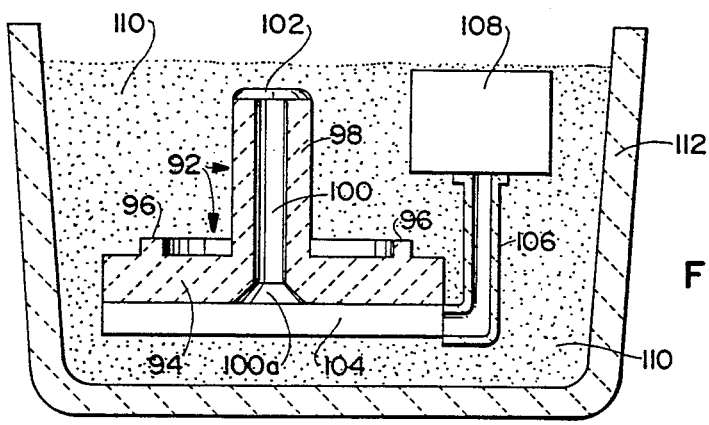
Fig. 8

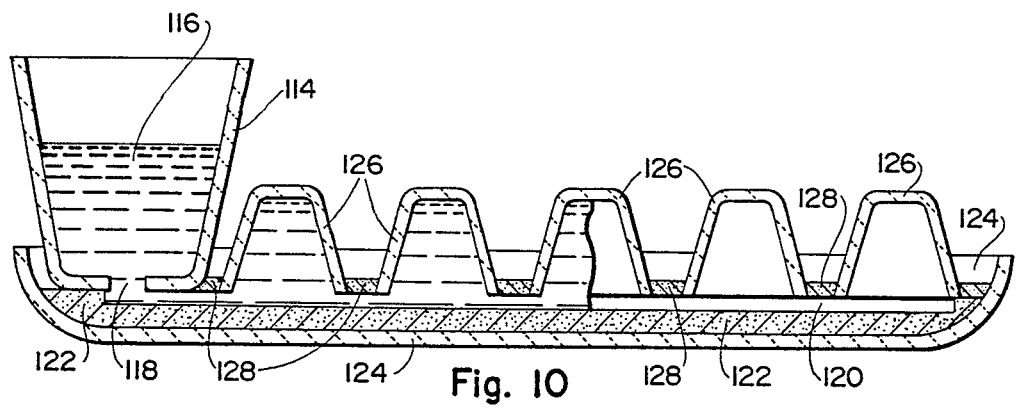
Fig. 10
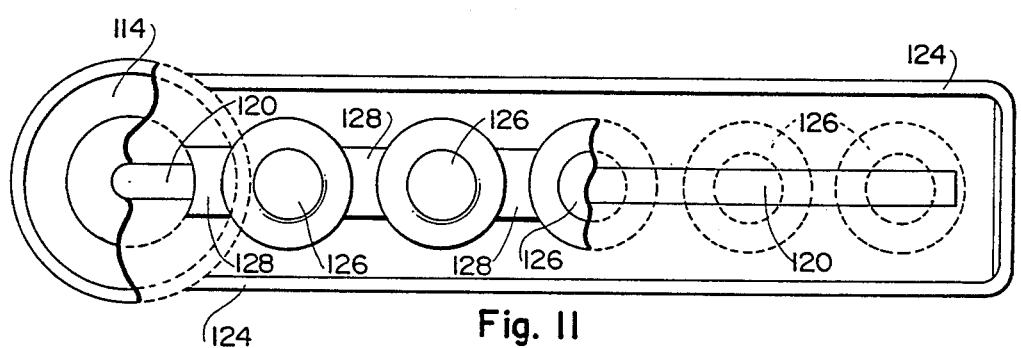
Fig. 11
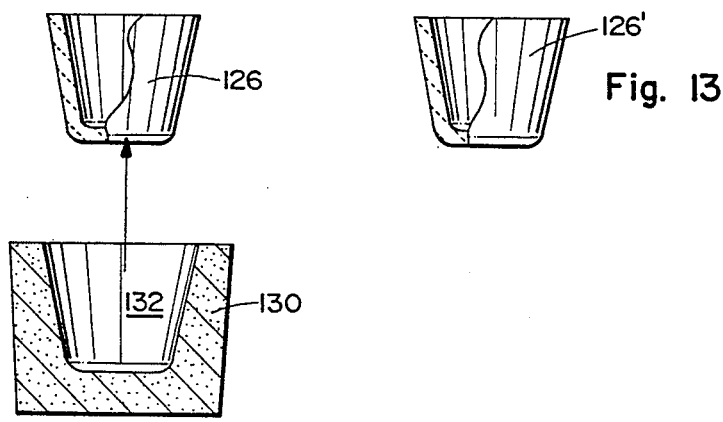
Fig. 12
Fig. 13

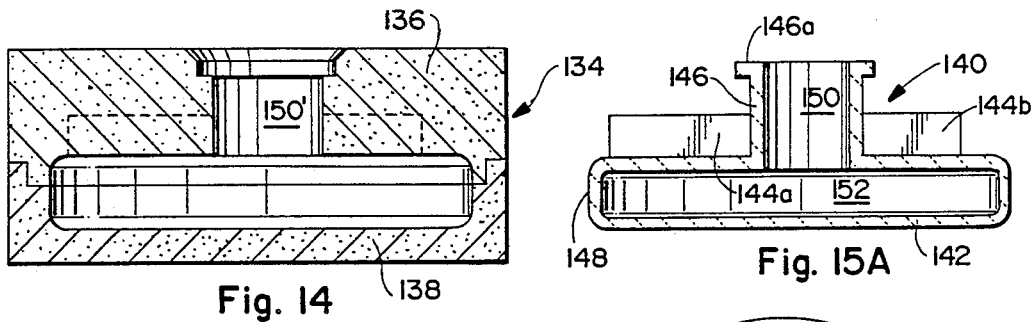
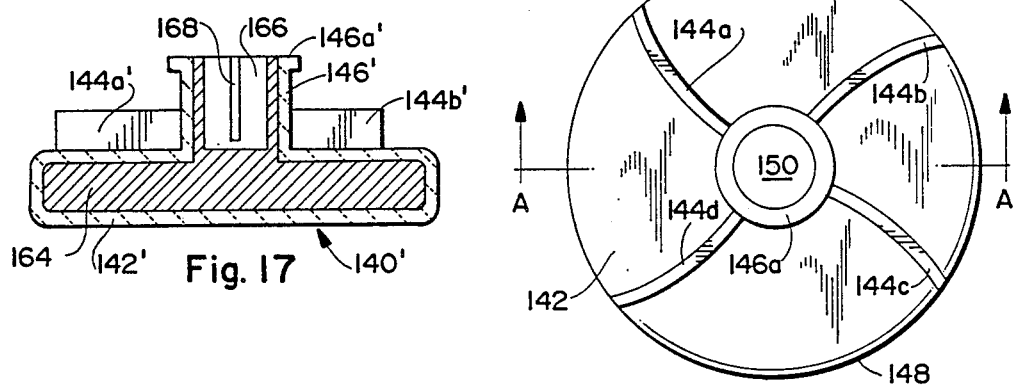
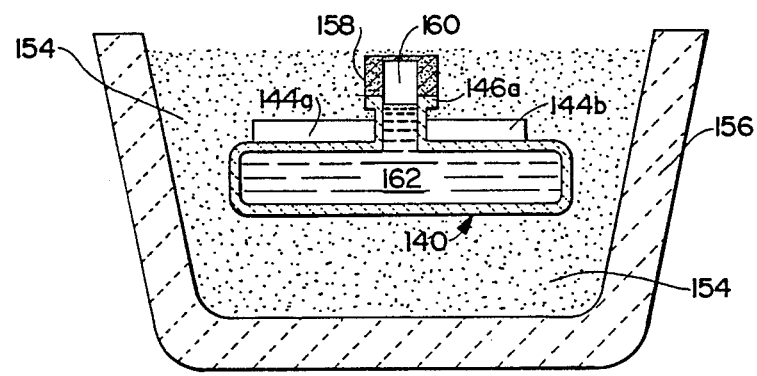

RESERVOIR FEED METHOD OF MAKING CERAMIC COMPOSITE STRUCTURES AND STRUCTURES MADE THEREBY

BACKGROUND OF THE INVENTION

1. Field Of The Invention

The present invention broadly relates to methods of making ceramic composite structures. In particular, the invention relates to reservoir feed methods of making ceramic composite structures comprising a polycrystalline ceramic matrix embedding a filler.

2. Description of Commonly Owned U.S. Patent Applications

The subject matter of this application is related to that of Commonly Owned U.S. patent applications Ser. No. 819,397, filed Jan. 17, 1986 as a continuation-in-part of Ser. No. 697,878, filed Feb. 4, 1985, both in the name of Marc S. Newkirk et al and entitled "Composite Ceramic Articles and Methods of Making Same." This application discloses a novel method for producing a self-supporting ceramic composite by growing an oxidation reaction product from a parent metal into a permeable bedding of filler. However, the method does not provide for imparting a pre-selected shape or geometry to the resulting composite.

The method of growing ceramic oxidation reaction product is disclosed generically in Commonly Owned U.S. Pat. No. 4,713,360 which issued on Dec. 15, 1987 from U.S. patent application Ser. No. 818,943, filed Jan. 15, 1986, as a continuation-in-part of Ser. No. 776,964, filed Sept. 17, 1985, as a continuation-in-part of Ser. No. 705,787, filed Feb. 26, 1985 as a continuation-in-part of Ser. No. 591,392, filed Mar. 16, 1984, all in the name of Marc S. Newkirk et al and entitled "Novel Ceramic Materials and Methods of Making The Same." This discovery of an oxidation phenomenon, which may be enhanced by the use of a dopant alloyed in the parent metal, affords self-supporting ceramic bodies of desired size grown as the oxidation reaction product of the precursor parent metal.

The foregoing method was improved upon by the use of external dopants applied to the surface of the precursor parent metal as disclosed in Commonly Owned U.S. patent applications Ser. No. 822,999, filed Jan. 27, 1986, as a continuation-in-part of Ser. No. 776,965, filed Sept. 17, 1985 as a continuation-in-part of Ser. No. 747,788, filed Jun. 25, 1985 as a continuation-in-part of Ser. No. 632,636 filed Jul. 20, 1984, all in the name of Marc S. Newkirk et al and entitled "Methods of Making Self-Supporting Ceramic Materials".

Further developments of the foregoing methods enable the formation of ceramic composite structures which (1) contain therein one or more cavities which inversely replicate the geometry of a shaped precursor parent metal, and (2) have a negative pattern which inversely replicates the positive pattern of a parent metal precursor. These methods are described, respectively, (1) in Commonly Owned U.S. patent application Ser. No. 823,542 filed Jan. 27, 1986, in the name of Marc S. Newkirk et al, entitled "Inverse Shape Replication Method of Making Ceramic Composite Articles and Articles Obtained Thereby", and (2) in Commonly Owned U.S. patent application Ser. No. 896,157, filed Aug. 13, 1986 in the name of Marc S. Newkirk and entitled "Method of Making Ceramic Composite Articles With Shape Replicated Surfaces and Articles Obtained Thereby".

Also, methods of making ceramic composite structures having a pre-selected shape or geometry were developed. These methods include the utilization of a shaped preform of permeable filler into which the ceramic matrix is grown by oxidation of a parent metal precursor, as described in Commonly Owned U.S. patent application Ser. No. 861,025, filed May 8, 1986, in the name of Marc S. Newkirk et al and entitled "Shaped Ceramic Composites and Methods of Making the Same". Another method of making such shaped ceramic composites includes the utilization of barrier means to arrest or inhibit the growth of the oxidation reaction product at a selected boundary to define the shape or geometry of the ceramic composite structure. This technique is described in Commonly Owned U.S. patent application Ser. No. 861,024, filed May 8, 1986, in the name of Newkirk et al and entitled Method Of Making Shaped Ceramic Composites With The Use Of A Barrier.

The entire disclosures of all of the foregoing Commonly Owned U.S. Patent Applications and Patent are expressly incorporated herein by reference.

3. Background and Prior Art

In recent years, there has been increasing interest in the use of ceramics for structural applications historically served by metals. The above-noted Commonly Owned U.S. Patent Applications provide a significant advance in the art, particularly with respect to cost-effective production of high strength, fracture-tough ceramic and ceramic composite bodies. The techniques of the Commonly Owned U.S. Patent Applications enable the production of ceramic composite structures, including shaped ceramic composite structures and large ceramic structures, by utilizing an unusual oxidation phenomenon which permits by-passing the use of powder sintering and hot pressing technologies and their inherent limitations. For example, the necessity in such conventional powder technologies to densify the powder bodies as by compaction or pressing is incompatible with the manufacture of large, one-piece ceramic structures. Further, such powder processing technologies do not readily lend themselves to the preparation of ceramic composite structures. Ceramic composite structures comprise a heterogeneous material, body or article made of two or more different materials which are intimately combined in order to attain desired properties of the composite. Typically it comprises a ceramic matrix which embeds one or more diverse filler materials such as particulates, rods, fibers or the like.

The present invention is based on the use of one or more of the techniques of the Commonly Owned U.S. Patent Applications and U.S. Patent, further improved upon by providing a parent metal reservoir means as further described herein. These techniques overcome the above-described difficulties by producing high strength and fracture-tough ceramic microstructures by a mechanism which is more direct and less expensive than conventional approaches. The present invention provides further improved methods and means for reliably producing ceramic composite structures based on oxidation reaction products, of a size and thickness which is difficult or impossible to duplicate with prior technology. The present invention also allows the production of ceramic-surfaced metallic structural components which in certain cases are lighter in weight and lower in cost than many all-ceramic bodies.

SUMMARY OF THE INVENTION

In accordance with one aspect of the present invention, there is provided a method for producing a self-supporting ceramic composite structure which comprises a ceramic matrix obtained by oxidation reaction of a parent metal with an oxidant to form a polycrystalline material. In conducting the process, a body of the parent metal and a permeable filler are oriented relative to each other so that formation of the oxidation reaction product resulting will occur in a direction towards and into the filler. The parent metal provides a first source of molten parent metal and a reservoir of molten parent metal communicating with the first source as by gravity flow. The first source of molten parent metal reacts with the oxidant to form the oxidation reaction product, and at least a portion of the oxidation reaction product is maintained in contact with and extends between the first source of molten parent metal and the oxidant to progressively draw molten parent metal through the oxidation reaction product towards the oxidant and into the filler so that the oxidation reaction product continues to form within the filler at the interface between the oxidant and previously formed oxidation reaction product. The first source of molten parent metal is replenished, preferably by continuous means, from the reservoir as the reaction continues for a time sufficient to form the oxidation reaction product to infiltrate at least a portion of the filler with the oxidation reaction product to form the ceramic composite structure.

In yet another aspect of the present invention, there is provided a self-supporting ceramic-surfaced metal structure which comprises a substrate comprising a precursor metal, a filler superimposed on the substrate, and a ceramic matrix formed integrally with the substrate and embedding the filler by oxidation reaction of the precursor metal with an oxidant.

Generally, the present invention provides not only significant processing advantages in producing self-supporting ceramic composite structures, but enables the production of novel ceramic-surfaced metal structures, in which the ceramic surface is formed from the parent metal. That is, the parent metal is the precursor to the ceramic matrix and because it is formed integrally with metal, the resulting composite product comprises a ceramic surface on a metal substrate. The ceramic surface embeds a filler, and the ceramic surface may be formed either as an exterior or an interior surface, or both, on a substrate of the metal, and the ceramic surface may be of selected or predetermined thickness with respect to each total volume relative to the volumes of the metal substrate. These techniques of the present invention of replenishing parent metal enable the preparation of thick wall or thin wall ceramic structures, in which the relative volumes of ceramic matrix providing the ceramic surface is substantially larger or smaller than the volume of precursor metal substrate. If desired in the finished product, the parent metal substrate may be completely or partially removed, or it may be left intact.

The techniques of the present invention also enable the production of a series of ceramic composite structures from a common source of parent metal, thus considerably enhancing efficiency of operation.

In another aspect of the present invention, a ceramic-surfaced metal substrate part is provided wherein said substrate is bonded to the ceramic matrix of the surface.

In a further aspect of the present invention, a ceramic-surfaced metal substrate part is provided wherein the ceramic surface is in compression and the metal substrate is in tension at the interface between the two.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but, rather, it should be understood that, as used herein, the term refers to a body which is predominantly ceramic with respect to either composition or dominant properties, although the body may contain minor or substantial amounts of one or more metallic constituents derived from the parent metal, oxidant, or a dopant, most typically within a range of from about 1-40% by volume, but may include still more metal.

"Oxidation reaction product" generally means one or more metals in any oxidized state wherein a metal has given up electrons to another element, compound or combination thereof. Accordingly, an "oxidation reaction product" under this definition includes the product of reaction of one or more metals with an oxidant such as those described in this application.

"Oxidant" means one or more suitable electron acceptors or electron sharers and may be a solid, a liquid or a gas (vapor) or some combination of these (e.g., a solid and a gas) at the process conditions. Such definition is intended to include compounds which are reducible by the parent metal under the conditions of the process of the present invention.

"Parent metal" refers to that metal, e.g., aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g., aluminum, the metal identified should be read with this definition in mind unless indicated otherwise by the context.

Other advantages and capabilities of the present invention will be apparent from the ensuing description.

BRIEF DESCRIPTION OF THE DRAWINGS

FIG. 1 is a schematic, partially cross-sectional view in elevation showing an assembly of parent metal reservoir and first source of parent metal emplaced within masses of inert material and filler;

FIG. 1A is a view on an enlarged scale and with a part broken away of dotted line area A of FIG. 1;

FIG. 2 is a partial cross-sectional view in elevation of a self-supporting ceramic composite structure made by using the assembly of FIG. 1 in accordance with the present invention;

FIG. 6 is a cross-sectional view showing another assembly including a parent metal reservoir connected by a conduit to a thick walled preform and emplaced within a bed of inert retaining material contained within a refractory vessel;

FIG. 7 is a view in elevation of a self-supporting ceramic composite structure made by using the assembly of FIG. 6 in accordance with the present invention;

FIG. 8 is a cross-sectional view showing another assembly of a parent metal first source of parent metal emplaced in contact with a preform, and a parent metal reservoir positioned in gravity flow communication with the parent metal first source;

FIG. 9 is a plan view of the self-supporting ceramic composite structure made by using the assembly of FIG. 8 in accordance with the present invention;

FIG. 10 is a cross-sectional view in elevation of yet another assembly, including a parent metal reservoir connected in gravity flow communication with a plurality of preforms, the parent metal being omitted from the rightmost portion of the figure for improved clarity of illustration;

FIG. 11 is a plan view with parts broken away of the assembly of FIG. 10 with some portions omitted for clarity of illustration and shown in dotted outline;

FIG. 12 is a schematic, partially cross-sectional view in elevation of an open mold for slip-casting a hollow preform, showing the resultant preform removed from the mold;

FIG. 13 is a partially cross-sectional view in elevation of a self-supporting ceramic composite structure made by using the assembly of FIGS. 10 and 11 in accordance with the present invention;

FIG. 14 is a cross-sectional view in elevation of a split mold for slip-casting a hollow preform;

FIG. 15 is a plan view of the hollow preform slip-cast using the mold of FIG. 14;

FIG. 15A is a section view taken along line A—A of FIG. 15;

FIG. 16 is a cross-sectional view in elevation showing an assembly of a first source of parent metal emplaced within the hollow preform of FIG. 15A and a parent metal reservoir positioned in gravity flow communication with the first source, the assembly being emplaced within a retaining bed of inert material contained within a refractory vessel;

FIG. 17 is a view corresponding to that of FIG. 15A but showing a self-supporting, metal-filled ceramic-surfaced composite structure made by using the assembly of FIG. 16 in accordance with the present invention;

DETAILED DESCRIPTION OF THE INVENTION AND PREFERRED EMBODIMENTS THEREOF

Figure 3:
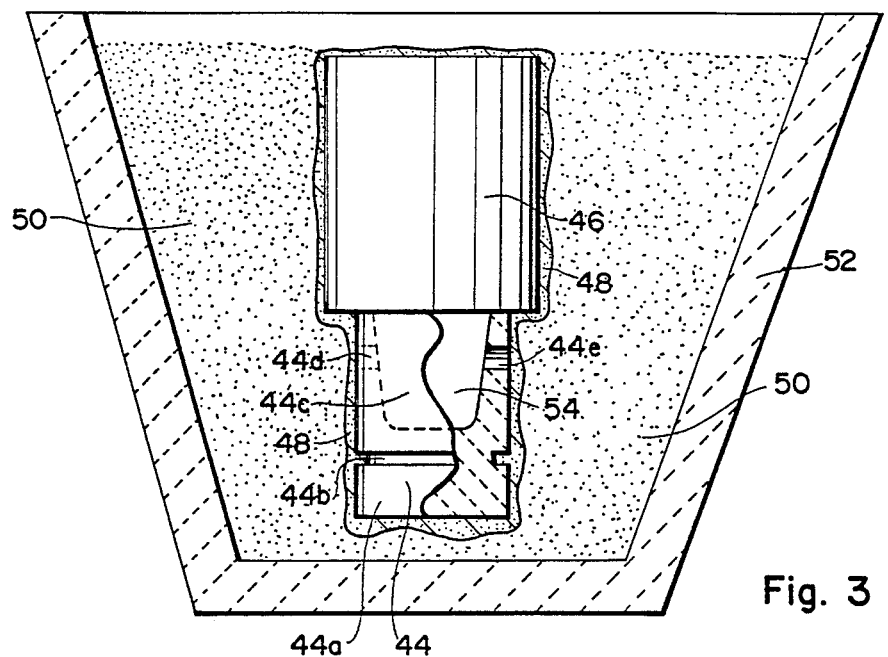
FIG. 3 is a schematic, cross-sectional view in elevation of an assembly including a parent metal reservoir and a preform encased in a barrier means and emplaced within a retaining bed contained within a refractory vessel.

In the practice of the present invention, a parent metal reservoir is positioned relative to the mass of filler so that, when the metal is molten, it may be flowed to replenish, and in some cases to initially provide and subsequently replenish, that portion, segment or source of parent metal which is in contact with the filler. A barrier means may optionally be placed to define or coincide with at least one surface of the mass of filler, and the assembly is placed in an oxidizing environment (or if oxidant is included in the preform, the assembly may be placed in an inert environment) and heated to a temperature region above the melting point of the parent metal but below the melting point of the oxidation reaction product of the parent metal. The mass of filler is permeable to development of the oxidation reaction product so as to allow infiltration, and if the oxidant includes a vapor-phase oxidant, e.g., air, the mass of filler is permeable to the oxidant. Upon contact with the oxidant, the molten metal reacts to form oxidation reaction product which infiltrates the mass of filler, thereby commencing the embedment of filler constituents with the ceramic matrix comprised of the polycrystalline material obtained by oxidation of the parent metal. At least a portion of the oxidation reaction product is maintained in contact with and extends between the molten parent metal and the oxidant, such that upon continued exposure to the oxidant, the molten parent metal is progressively drawn into and through the oxidation reaction product towards the oxidant. The molten parent metal contacts the oxidant and forms additional oxidation reaction product so as to cause continued growth of the polycrystalline oxidation reaction product material in the mass of filler. In some cases, metallic constituents representing non-oxidized constituents of the parent metal or reduced constituents of the oxidant, and/or voids may be left dispersed through the polycrystalline material. Typically, the oxidation reaction product consists essentially of crystallites which are interconnected, preferably in three dimensions, and the non-oxidized, metallic constituents, when present, may be at least partially interconnected or may comprise discrete, unconnected "islands" of metallic constituents. Such oxidation reaction, including infiltration of a filler with the oxidation reaction product, is described in detail in the Commonly Owned U.S. Patent Applications.

The process is continued until the polycrystalline matrix material has infiltrated and embedded the filler material to the desired extent, for example, to the optional barrier means defining at least one surface boundary of the mass of filler. The barrier means is used to inhibit, prevent or terminate growth of the oxidation reaction product thereby providing net, or near net, shapes in the resulting ceramic composite.

In accordance with the invention, the parent metal is apportioned in such a manner as to provide a first source of parent metal which is the reacting source in that a body of this first source is in contact with the filler and is the precursor to the oxidation reaction product. Additionally, there is a second portion of parent metal, which is the unreacted source of parent metal and serves as the reservoir to the first source. The reservoir is in communication with the first source, and parent metal flows, as by gravity, from the reservoir to the first source to replenish the source of parent metal which has undergone oxidation reaction, thereby assuring that ample parent metal is available to continue the process until the polycrystalline material has grown to the desired extent, e.g., to the boundary surface of the bedding of filler. In some cases the barrier means encloses or encases the outer surfaces of the bedding of filler so that the boundary surface of the bedding, and therefore the extent of growth of the polycrystalline material, is defined by the barrier means. In such cases, the shape of the ceramic body is substantially congruent to that of the interior surface of the barrier means. The extent of formation of the polycrystalline matrix material may also be limited by means other than barrier means, e.g., such as by supplying one or more dopants and/or oxidants only to portions of a mass of filler in which formation of the polycrystalline material is desired. Stated generally, oxidation reaction kinetics more favorable to growth are maintained within the mass of filler than those maintained outside the mass of filler.

The ceramic composite structure may have a negative pattern replicating the configuration of a parent metal source in reverse, or contain one or more cavities, e.g., it may comprise a hollow body. The parent metal replenishment technique of the present invention enables the negative pattern or cavity to contain or be entirely filled with parent metal which solidifies as the structure is allowed to cool after processing. The solidified parent metal may optionally be removed from the negative pattern or cavity containing it, as described below. When a preform is used, i.e., a shaped body of filler bonded by a suitable binder and having sufficient green strength for handling and processing, the shape of the ceramic composite body will substantially coincide with the shape of the preform when steps are taken, as described above, either by using a barrier means or by maintaining oxidation reaction kinetics within the preform which are more favorable than those outside the preform.

Although the invention is described below in detail with specific reference to aluminum as the preferred parent metal, other suitable parent metals which meet the criteria of the present invention include, but are not limited to, silicon, titanium, tin, zirconium and hafnium. For example, specific embodiments of the invention include, when aluminum is the parent metal, alpha-alumina, aluminum nitride or aluminum boride as the oxidation reaction product; titanium as the parent metal and titanium nitride or titanium boride as the oxidation reaction product; silicon as the parent metal and silicon carbide, silicon nitride or silicon boride as the oxidation reaction product.

As described in detail in the above-noted Commonly Owned U.S. Pat. No. 4,713,360 and U.S. patent application Ser. No. 822,999 and their respective ancestor applications, one or more dopants may be used in conjunction with the parent metal. As used herein and in the claims, use of a dopant or dopants in conjunction with a parent metal, means and includes the steps of (1) alloying a dopant or dopants into one parent metal, (2) applying a dopant or dopants externally to at least part of the surface of a parent metal body, (3) placing a dopant or dopants in proximity to a parent metal body, for example, placing a dopant or dopants into a mass of filler into which the polycrystalline oxidation reaction product of the parent metal is grown or formed, and (4) a combination of any of the foregoing steps.

A solid, liquid, or vapor-phase oxidant, or a combination of such oxidants, may be employed. For example, typical oxidants include, without limitation, oxygen, nitrogen, a halogen, sulphur, phosphorus, arsenic, carbon, boron, selenium, tellurium, and compounds and combinations thereof, for example, silica (as a source of oxygen), methane, ethane, propane, acetylene, ethylene, and propylene (as sources of carbon), and mixtures such as air, $H_2/H_2O$ and $CO/CO_2$, the latter two (i.e., $H_2/H_2O$ and $CO/CO_2$) being useful in reducing the oxygen activity of the environment. Accordingly, the ceramic structure of the invention may comprise, for example, an oxidation reaction product comprising one or more of oxides, nitrides, carbides and borides. More specifically, the oxidation reaction product may be one or more of aluminum oxide, aluminum nitride, silicon carbide, silicon boride, aluminum boride, titanium nitride, zirconium nitride, titanium boride, zirconium boride, zirconium carbide, silicon nitride, titanium carbide, hafnium carbide, hafnium boride and tin oxide.

Although any suitable oxidants may be employed, specific embodiments of the invention are described below with reference to use of vapor-phase oxidants. If a gas or vapor oxidant is used, the mass of filler is permeable to the vapor-phase oxidant so that it can permeate the filler to contact molten parent metal being transported through the forming oxidation reaction product. Oxygen or gas mixtures containing oxygen (including air) are preferred vapor-phase oxidants, as in the case where aluminum is the parent metal, with air usually being most preferable for obvious reasons of economy. When an oxidant is identified as containing or comprising a particular gas or vapor, this means an oxidant in which the identified gas or vapor is the sole, predominant or at least a significant oxidizer of the parent metal under the conditions in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "oxygen-containing gas" oxidant but not within the definition of a "nitrogen-containing gas" oxidant as used herein and in the claims is "forming gas", which contains typically 96 volume percent nitrogen and 4 volume percent hydrogen.

When a solid oxidant is employed, it is usually dispersed through the entire mass of filler or through a portion of the filler adjacent the parent metal, in the form of particulates admixed with the filler, or perhaps as coatings on the filler particles. Any suitable solid oxidant may be employed including elements, such as boron or carbon, or reducible compounds, such as silicon dioxide or certain borides of lower thermodynamic stability than the boride reaction product of the parent metal. For example, when a boron or a reducible boride is used as a solid oxidant for an aluminum parent metal, the resulting oxidation reaction product is aluminum boride.

In some instances, the oxidation reaction may proceed so rapidly with a solid oxidant that the oxidation reaction product tends to fuse due to the exothermic nature of the process. This occurrence can degrade the microstructural uniformity of the ceramic body. This rapid exothermic reaction can be avoided or moderated by mixing into the composition relatively inert fillers which exhibit low reactivity. An example of such a suitable inert filler is one which is essentially identical to the intended oxidation reaction product.

If a liquid oxidant is employed, the entire mass of filler or a portion thereof adjacent the molten metal is coated or soaked with the oxidant to impregnate the filler. Reference to a liquid oxidant means one which is a liquid under the oxidation reaction conditions, and so a liquid oxidant may have a solid precursor, such as a salt, which is molten at the oxidation reaction conditions. Alternatively, the liquid oxidant may be a liquid precursor, e.g., a solution of a material, which is used to impregnate part or all of the filler and which is melted or decomposed at the oxidation reaction conditions to provide a suitable oxidant moiety. Examples of liquid oxidants as herein defined include low melting glasses.

The filler utilized in the practice of the present invention may be one or more of a wide variety of materials suitable for the purpose. The mass of filler may be a "conformable" filler which term, as used herein, means that the filler is one which can be placed within a container or have a shaped parent metal embedded within it or placed in conforming engagement with it, and it will conform to the configuration of the container or shaped parent metal. The use of a conformable filler permits utilization of the techniques described in the Commonly Owned U.S. Patent Application referred to above, "Methods of Making Ceramic Composite Articles With Shape Replicated Surfaces and Articles Obtained Thereby". Conformable fillers may comprise particulate material, such as fine grains of a refractory metal oxide, fibers, such as short chopped fibers or a fiber wool-like material, e.g., something like steel wool, or a combination of two or more such physical configurations, e.g., a combination of fine grains and fibers. Any useful type of filler or combination thereof may be employed as described in the aforesaid Commonly Owned Patent Applications. A preform which is shaped in the desired configuration of the ceramic composite structure to be produced may also be employed as the mass of filler.

The first source parent metal, that is, as a solid for being in contact with the filler, may be formed to a predetermined shape or pattern. This shaped body of parent metal is embedded within or placed in conforming engagement with a mass of filler in order to inversely replicate the shape or pattern of the parent metal body. Upon formation of the ceramic composite structure, the pattern is inversely replicated by the composite. If such inverse replication is not desired or necessary, a preform may be used to achieve a composite body of predetermined shape, and the first source of parent metal may be of any convenient shape, such as an ingot, billet, bar, etc. The reservoir of parent metal may be of any convenient shape and quantity and may be positioned in gravity flow communication with the first source of parent metal so that molten parent metal flows by gravity from the reservoir to the forming location of the oxidation reaction product.

The parent metal reservoir may conveniently be contained within a bed of particulate inert material, which will not sustain or promote the oxidation reaction of the molten parent metal. Molten parent metal is passed or fed to the first source of parent metal through an opening in the bottom of the container. Alternatively, the reservoir of parent metal may be contained within a suitable refractory vessel.

Referring now to the drawings, FIG. 1 shows an assembly 10 having a reservoir chamber 12 and a barrier means container 14 positioned below and connected to reservoir chamber 12 by an opening (unnumbered) in the floor 28 of reservoir chamber 12. Barrier means container 14 is substantially cylindrical in configuration and has an interior surface defined by a screen 16 (FIGS. 1 and 1A) contained within and reinforced by a perforated cylinder 18 which serves as an outer, rigid member which reinforces cylindrical screen 16. A perforated metal sheet, such as a stainless steel, may be substituted for the screen. Cylinder 18 has formed throughout its surface a pattern of perforations 20 (FIG. 1A) and is rigid enough to retain during processing the shape of a mass of conformable filler which is to be embedded by the matrix of ceramic material grown from the parent metal. Screen 16 may be a refractory cloth or a metal, e.g., stainless steel screen. In any case, in the illustrated embodiment it is a woven, open mesh screen, many of the openings of which are aligned with perforations 20 of cylinder 18, so that barrier means container 14 is open to entry therein of the surrounding oxidizing atmosphere. A plurality of stainless steel angle braces 22 is positioned at spaced locations about the outer surface of cylinder 18 and held in place by clamp rings 32 to reinforce the structure. A base 24, which may be either of solid or foraminous construction, closes the bottom of barrier means container 14.

Reservoir chamber 12, which is also of cylindrical configuration and of a diameter larger than barrier means container 14, is enclosed by reservoir walls 26 and a floor 28, which are constructed of imperforate material. In the illustrated embodiment, the parent metal is apportioned to provide a reservoir 34 of parent metal supported within a bed of inert material 30 contained within reservoir chamber 12, and a shaped, elongated first source 36 of parent metal supported within a mass of conformable filler 38 which fills barrier means container 14. The reservoir 34 has an inwardly tapering portion from which a circular cylindrical portion extends downwardly into abutting contact with the first source 36 at the juncture of reservoir chamber 12 and barrier means container 14. In the illustrated embodiment, the elongated, cylindrical parent metal 36 is shaped to have a series of three generally disc-shaped protrusions 36a, 36b and 36c at longitudinally spaced-apart locations thereon and extends as a core of parent metal within and in contact with a mass of conformable filler 38. One or more dopants to facilitate the oxidation reaction may be alloyed within the parent metal (including reservoir 34) and/or may be externally applied to the first source 36, or parts thereof, and/or applied to filler 38, at least in the vicinity of first source 36.

Reservoir chamber 12 is filled with a retaining bed of particulate inert material 30 which is non-wettable by molten parent metal so that formation and growth of the polycrystalline material thereon is precluded or greatly inhibited. Accordingly, a body of molten parent metal obtained upon melting to provide reservoir 34 is available for gravity flow from the bed 30 to the first source 36, to replenish parent metal which has been consumed in the oxidation reaction. In the case of an aluminum parent metal, the material 30 may comprise particulate El Alundum, a product of Norton Company. If necessary or desirable, a reservoir cover plate may close the top opening of reservoir chamber 12 against the surrounding atmosphere, and a sealing plate may similarly be employed between reservoir chamber 12 and barrier means container 14, except for an opening to permit flow communication of molten parent metal from reservoir 34 to the first source 36.

The conformable filler 38, within barrier means container 14, conforms to the interior surface of barrier means container 14 defined by screen 16, whereby the interior configuration of the barrier means container 14 defines the outer boundary or configuration of the mass of filler 38 as a growth-arresting boundary of the oxidation reaction product. This boundary therefore defines the outer configuration of the ceramic composite structure to be grown within the barrier means container 14. Further, such packing also conforms the filler to the shape or geometry of first source 36 so that the latter defines and fills a shaped cavity within the mass of conformable filler 38.

The filler-bed assembly 10 is placed within a furnace containing, or into which is introduced, a suitable vapor-phase oxidant. Alternatively, or in addition, a solid or liquid oxidant, or both, may be provided within the mass of filler 38. When a vapor-phase oxidant is used, it may, for example, comprise atmospheric air, in which case suitable vents in the furnace may be utilized to supply a source of the vapor-phase oxidant simply by the admission of air to the furnace interior. The entire assembly 10 may be supported in an upright position (as shown in FIG. 1) within the furnace by any suitable support means, not shown. The vapor-phase oxidant enters the mass of conformable filler 38 through perforations 20 of cylinder 18 and the apertures of screen 16 and oxidizes the molten parent metal. The resultant growth of polycrystalline oxidation reaction product proceeds as described above as molten parent metal is drawn from the first source 36 through the oxidation reaction product to be oxidized on the surface thereof and form additional oxidation reaction product. The supply of molten parent metal is replenished by the flow from reservoir 34 to first source 36. When the growing polycrystalline material reaches screen 16, further growth is stopped by the growth-arresting barrier means provided by screen 16, backed by cylinder 18. In this manner, the growth of oxidation reaction product is limited to substantially conform to the barrier means provided, in the illustrated embodiment, by the interior surface of screen 16 of the barrier means container 14. It will be appreciated that the interior of barrier means container 14 may be fashioned in any of a large number of shapes to provide a desired surface geometry to the resultant ceramic composite body.

The quantity of reservoir 34 of parent metal may be predetermined relative to the first source 36 to provide sufficient parent metal to maintain the first source 36 filled with metal at least until the entire volume of filler 38 is infiltrated or embedded by the polycrystalline oxidation reaction product. When this point is reached, the furnace temperature is reduced and the assembly is allowed to cool, and the first source 36 of parent metal solidifies and intimately engages the ceramic matrix. The resulting ceramic composite structure thus comprises a ceramic-surfaced metal substrate, and in this embodiment, the ceramic substrate is disposed exterior to, and partially encompasses, the metal substrate.

For easy disassembly, if desired, perforated cylinder 18 may be comprised of two half-cylinders held in place by any suitable means, e.g., the angle iron braces 22 and clamp rings 32, which may be removed to permit removal of the two longitudinally split halves of perforated cylinder 18. Screen 16 may be unrolled or cut away after removal of perforated cylinder 18. The ceramic composite structure may be cut transversely at or near the upper portion (as viewed in FIG. 1) of barrier means container 14 to provide a substantially cylindrical shaped ceramic composite 40 as shown in FIG. 2. Ceramic composite 40 has an interior bore 42 which is an inverse replication of the shape of the first source 36 of parent metal member, including a series of three enlarged chambers 42a, 42b and 42c. Resolidified parent metal in bore 42 may, if desired, be removed in any suitable way. For example, bore 42 may be drilled out and the remaining metal, mostly within chambers 42a–42c, may be removed by chemical dissolution, e.g., by hydrochloric acid in the case of aluminum parent metal. Hydrochloric acid dissolves the metal but does not deleteriously affect the ceramic composite. In some cases, it may be desired to leave all or part of the parent metal core in place to produce a finished product having a parent metal core or substrate or to replace some or all of the core with some other material such as another metal or alloy or some other material such as a a synthetic organic polymeric material (plastic).

The outer surface of ceramic composite 40 may have a rough surface replicating the weave pattern of the screen, and it therefore may be desirable to machine the outer surface to render it smooth, although in some cases the rough texture of screen 16 (or some other selected pattern) may be desired.

For some configurations of barrier means container 14, it may be necessary or desirable to provide by means of elbow-type connections one or more additional metal reservoirs for introduction of replenishment molten metal at several points along first source 36.

Referring now to FIG. 3, there is shown an assembly of a preform 44 on top of which there is positioned in abutting contact a parent metal reservoir 46. The exterior surfaces of reservoir 46 and of preform 44 are encased within a barrier means comprised of a plaster of paris layer 48, which is rendered air-permeable by incorporating a combustible material into layer 48. The barrier means encases and so defines a boundary of at least one surface of preform 44. In the illustrated embodiment, the barrier means-encased surface is the entire surface of preform 44 except for that portion which is contacted by reservoir 46. Thus, as used herein and in the claims, the at least one surface or at least one surface boundary of a mass of filler, defined by the barrier means, refers to that portion of the mass covered or engaged by the barrier means.

The plaster of paris-encased reservoir 46 and preform 44 are supported by a retainer bed of inert material 50 contained within a refractory vessel 52, for example, an alumina refractory vessel 52. Preform 44 has the shape of an internal combustion engine piston and includes a head portion 44a, an annular groove 44b, and a hollow portion 44c, in which are formed a pair of radially opposite connector openings 44d and 44e. A first source 54 of parent metal is disposed within hollow portion 44c and in contact with the interior surfaces thereof. The plaster of paris layer 48 encasing preform 44 provides a growth-arresting barrier which conforms to the outer surface of preform 44 and helps to insure a smooth surface to the ceramic composite body by preventing growth of polycrystalline material outside of preform. The layer 48 of plaster of paris surrounding reservoir 46 facilitates the assembly and provides a container for the molten parent metal obtained upon heating the assembly. However, the bed of inert material 50, being non-wettable by the molten parent metal, would satisfactorily retain in place the reservoir of molten parent metal even were it not encased by the plaster of paris. The bed of inert material 50 is also permeable to the vapor-phase oxidant, e.g., air. Upon being heated to a suitable process temperature, as described above, the vapor-phase oxidant, e.g., air, oxidizes molten parent metal as it is transported to the surfaces of oxidation reaction product to form a polycrystalline matrix material as described above. As molten parent metal from first source 54 is consumed, molten parent metal from reservoir 46 replenishes source 54 and the reaction continues until the polycrystalline ceramic matrix grows to the barrier means provided by plaster of paris layer 48 around preform 44. At this point the reaction is stopped, as by lowering the furnace temperature, and the assembly may be removed from bed 50 and the plaster of paris layer removed as by grit blasting. Molten parent metal may be poured out of hollow portion 44c and any residual, i.e., unreacted, parent metal which solidifies therein may be removed by mechanical or chemical means as described above.

Figure 4:
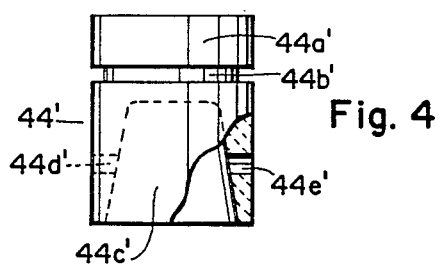
FIG. 4 is a view in elevation, partially broken away, of a self-supporting ceramic composite structure made by using the assembly of FIG. 3 in accordance with the present invention.

FIG. 4 shows the ceramic composite structure obtained from the assembly of FIG. 3. A ceramic composite piston 44' is comprised of the preform 44 infiltrated by a ceramic matrix comprising the oxidation reaction product and, optionally, metallic constituents such as non-oxidized constituents of the parent metal or reduced constituents of dopant, filler or oxidant (in the case where the oxidant is a reducible compound of a metal). Because growth of the ceramic matrix is arrested at the boundary defined by the outer surface of the preform 44, the resultant piston 44' is accurately shaped to have a head portion 44a', an annular groove 44b', a hollow portion 44c' and a pair of radially opposite wristpin openings 44d' and 44e'.

Figure 5:
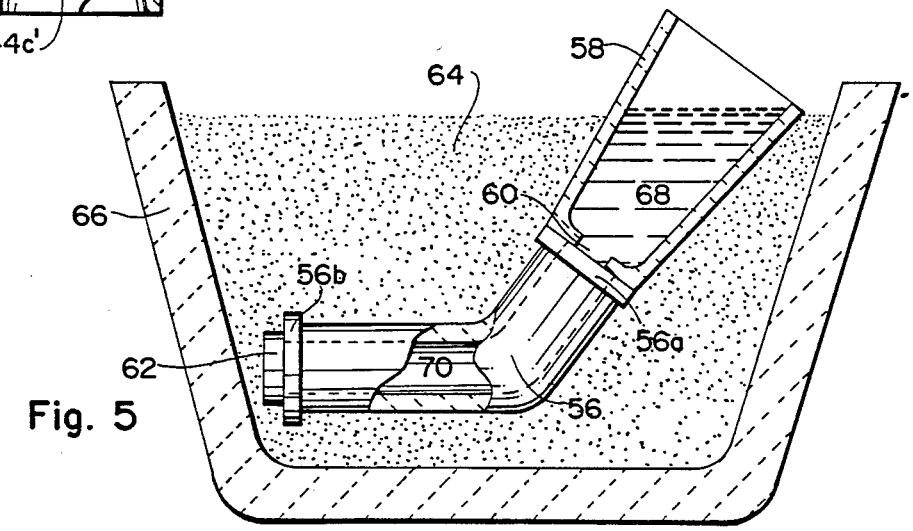
FIG. 5 is a view corresponding to FIG. 3 but showing another assembly of a reservoir of molten parent metal in contact with a preform and emplaced within a retaining bed contained within a refractory vessel, thus providing a lay-up suitable for practicing the present invention.

FIG. 5 shows another assembly in which a filler preform 56 has the shape of a 45° elbow pipe joint having flanges 56a and 56b at its respective opposite ends. A refractory reservoir vessel 58 has a hole 60 formed in the bottom thereof and is tilted from the vertical in order to place it in flush, abutting contact with flange 56a of preform 56. Flange 56b is stoppered by a plug 62 of a suitable material, such as plaster of paris. The assembly is received within a bed of inert material 64 which in turn is contained within a refractory vessel 66. FIG. 5 shows molten parent metal reservoir 68 contained within refractory reservoir vessel 58 and which will flow into preform 56 to replenish molten first source 70 of parent metal contained therein.

In both the FIG. 3 and FIG. 5 embodiments, solid parent metal as the first source (54 in FIG. 3 and 70 in FIG. 5) could be emplaced and thus melted in situ to provide the first source of molten parent metal. Alternatively, only the reservoir (46 in FIG. 3 and 68 in FIG. 5) need initially be provided and, upon melting, molten parent metal from the reservoir will flow into contact with the preform (44 in the FIG. 3 embodiment and 56 in the FIG. 5 embodiment) to constitute the first source of parent metal in contact with the filler. This first source of parent metal may thus be both initially provided from, and thereafter replenished by, flow from the parent metal reservoir.

The provision of a reservoir of parent metal to replenish the first source of parent metal contained within the interior of hollow portion 44c helps to insure efficient and uniform growth of the ceramic matrix into preform 44 by providing at all times an inventory of parent metal to completely fill the hollow interior of portion 44c. This eliminates the possibility that portions of the preform 44 may not be filled with ceramic matrix because using up the level of molten parent metal within hollow portion 44c as the metal consumed, starves the supply of molten parent metal to the (as viewed in FIG. 3) preform 44.

In the case of the FIG. 5 embodiment, the first source 70 of parent metal may be provided either by placing a solid body of molten metal within preform 56 prior to heating, or by flow of molten parent metal from reservoir vessel 58 to fill the interior of preform 56. It is apparent that the illustrated relative thickness of the walls of preform 56 as compared to its hollow interior are such that more than enough molten parent metal is contained therein to fill the entirety of the preform filler with the ceramic matrix upon carrying out the oxidation reaction. The advantage of producing a reservoir of molten metal in this case is, as noted above with respect to the FIG. 3 embodiment, that it keeps the level of molten parent metal high enough to keep the interior of preform 56 filled to the top, thereby to help insure uniform growth of polycrystalline matrix material throughout the preform 56, without discontinuities in the ceramic matrix.

In the FIG. 5 embodiment, the preform 56 is packed within a bed 64 of particulate inert material into which significant growth of the ceramic matrix will not occur and so the ceramic matrix will grow to the boundary defined by the outer surfaces of preform 56. The plaster of paris plug 62 serves to keep the particulate inert material 64 out of the interior of preform 56. If necessary or desirable, plaster of paris or some other similar material may be used in the manner of a packing seal about the bottom of refractory reservoir vessel 58 and flange 56a of preform 56. Optionally, the entire exterior of preform 56 may be encased within a layer of air-permeable plaster of paris, which is removed from the finished ceramic composite body.

Referring now to FIG. 6, there is shown another assembly in which a generally circular cylindrical shaped preform 72 has a base portion 74 and a narrower neck portion 76 which terminates in an end portion 78. A hollow bore 80 extends through preform 72 concentrically about the longitudinal axis thereof. The end of bore 80 which opens to the surface of end portion 78 is closed off by a plug 82 of a suitable material such as plaster of paris. The opposite end of bore 80 which opens at the end of the base portion 74 is positioned in flow communication with a conduit 84 made of a suitable material, which may also be plaster of paris. Conduit 84 is thus a short section of a plaster of paris pipe or tubing, one end of which abuts the end of base portion 74 and the opposite end of which is in abutting contact with a parent metal reservoir 86. Conduit 84 and reservoir 86 are generally coaxially aligned. Preform 72 is positioned so that its longitudinal axis L defines an angle a with the horizontal, which is indicated by line H—H. By thus positioning preform 72 with its end 78 inclined slightly, say at an angle of 5° to 10°, below the horizontal, the flow of molten parent metal from reservoir 86 through conduit 84 thence into bore 80 is facilitated. Preform 72, conduit 84 and parent metal reservoir 86 are supported within a bed of particulate inert material 88 which is contained within a refractory vessel 90. Upon carrying out the process, the parent metal reservoir 86 melts and flows through conduit 84 into bore 80, filling bore 80 with molten parent metal. The opening provided in conduit 84 and bore 80 may thus be considered to serve as a sprue through which molten parent metal is supplied to preform 72. Plug 82 keeps inert material 88 out of bore 80. A vapor-phase oxidant, such as air, permeates the bed of inert material 88 and preform 72 to oxidize the molten parent metal. As molten parent metal contained within bore 80 is consumed, the parent metal is replenished with molten metal flowing from reservoir 86 so that bore 80 is maintained entirely filled with molten parent metal throughout the process.

As clearly illustrated in FIG. 6, the quantity of molten metal which can be contained within bore 80 is insufficient, without replenishing the consumed metal, to entirely fill preform 72 with the polycrystalline material obtained by oxidation reaction of the parent metal which provides the ceramic matrix infiltrating preform 72. (This stands in contrast to the arrangement of FIG. 5 wherein the supply of molten parent metal 70 within preform 56 is clearly more than ample to fill the relatively thin walls of preform 56 with the ceramic matrix.) In the case of the FIG. 6 embodiment, reservoir 86, in addition to assuring a uniform supply of molten metal also provides a means for continuously supplying sufficient molten parent metal via the relatively small volume bore 80 to completely fill preform 72 with the polycrystalline oxidation reaction product. The replenishment technique of the present invention thus permits forming the polycrystalline material from a small volume zone of a first source of molten parent metal, and from such a zone, infiltrating a much larger volume of filler with the polycrystalline matrix material. In fact, by continuing to replenish the molten parent metal in the zone, a volume of filler of just about any desired size can be infiltrated with polycrystalline matrix material made from parent metal introduced to the oxidation reaction from such zone.

Formation of the ceramic matrix is stopped at the boundary defined by the outer surfaces of preform 72. As noted above, if desired, preform 72 may be encased within a suitable barrier means. The solidified core of parent metal remaining within bore 80 may be left in place in the finished structure, or totally or partially removed or replaced with another suitable material as required. The finished ceramic composite structure is shown in FIG. 7 as comprising a ceramic composite body 72' having a base portion 74', a neck portion 76' with a concave recess and an end portion 78', with a bore 80' extending longitudinally therethrough.

FIG. 8 shows another assembly in which a preform 92 has a generally disc-shaped wheel portion 94, from one side of which extend a central, hollow shaft 98 and a concentric circular rim 96. Shaft 98 has a bore 100 extending therethrough which terminates in an outwardly flared end 100a thereof which opens to the face of wheel portion 94 opposite that from which rim 96 and shaft 98 extend. The upper end (as viewed in FIG. 8) of bore 100 is stoppered by a plug 102 of suitable material such as plaster of paris. Beneath (as viewed in FIG. 8) preform 92 and in abutting engagement therewith is positioned a parent metal source body 104.

A right-angle elbow conduit 106 has one open end thereof positioned in abutting contact with parent metal source body 104, and the opposite, upper (as viewed in FIG. 8) open end thereof positioned in abutting contact with a parent metal reservoir 108. Only one such parent metal reservoir 108 and associated conduit 106 are illustrated in FIG. 8, but it will be appreciated that two or more reservoirs of parent metal and their associated conduits may be similarly positioned about the periphery of the first source 104 of parent metal which is preferably disc-shaped and may be of substantially the same diameter as wheel portion 94 of preform 92. Preform 92, the bodies of parent metal 104 and 108 and conduit 106 are all contained within a bed of particulate inert material 110 which is contained within a refractory vessel 112.

Upon being heated to an appropriate reaction temperature, say within a furnace in an air atmosphere, the parent metal melts to provide a first source 104 of parent metal in contact with preform 92 and parent metal of reservoir 108 melts and flows downwardly through conduit 106, thereby providing a head of parent metal which forces molten parent metal upwardly through end 100a and bore 100 to the top (as viewed in FIG. 8) of bore 100 where it is retained by plug 102. With this arrangement, reservoir 108 not only replenishes the first source 104 to assure a sufficient supply of parent metal to entirely fill preform 92 with polycrystalline matrix material, but fills and maintains the entire length of bore 100 with molten parent metal (so long as the level of molten metal in reservoir 108 is maintained at least as high as the top of bore 100). This helps to assure uniform growth of the ceramic matrix throughout preform 92. If reservoir 108 and its associated conduit 106 were omitted, even if parent metal source 104 were made large enough to assure a supply sufficient to fill preform 92 with the ceramic matrix, difficulties might be encountered in the flow of the molten parent metal therethrough, particularly at the choke point provided at the base of shaft 98 where it joins wheel portion 94. While the molten parent metal displays a good wicking action through the permeable preform 92, as the supply of molten parent metal provided by source 104 is exhausted, without reservoir 108 to provide a replenishment of molten parent metal under a static pressure head, in the case of very large components, the wicking action may well be insufficient to assure complete and uniform growth, especially throughout shaft 98 remote from wheel portion 94. The technique of the present invention successfully overcomes this problem in this illustrated embodiment by filling bore 100 to its top with a supply of molten metal under a more or less static pressure head, as well as by maintaining the source 104 of molten metal similarly filled. Reservoir 108 itself may be replenished from time to time, if and as required.

FIG. 9 shows the ceramic composite body 92' obtained from the assembly illustrated in FIG. 8, having a central shaft 98' within which is formed a bore 100', and including a wheel portion 94' having a circular rim 96' extending from the same face thereof from which shaft 98' extends. As noted above with the other embodiments, resolidified molten metal contained within bore 100 and end 100a may be removed from the finished ceramic composite product. Alternatively, all or part of bore 100 and end 100a may be left filled with resolidified parent metal or may be partially or completely filled with another suitable material. In either case, the material filling bore 100 and end 100a may, for example, be drilled to provide a smaller diameter bore extending therethrough.

Referring now to FIG. 10, there is shown in cross-sectional elevation an assembly including a refractory reservoir vessel 114 containing a parent metal reservoir 116 shown as substantially filled with molten parent metal. A hole 118 is formed in the bottom of vessel 114 through which molten parent metal flows by gravity into a shallow, central trough 120 formed in a base or floor 122 of retainer material. The retainer material may be formed from any suitable material, such as plaster of paris contained within a refractory boat 124. For example, a refractory boat 124 may be partially filled, e.g., to about one-half its depth as seen in FIG. 11, with flowable plaster of paris which is allowed to set and harden. A shallow central trough 120 is then cut from the hardened plaster of paris or, by use of a suitable form inserted into preset plaster of paris, is molded therein.

A plurality of identical permeable preforms 126 are of generally cup or tumbler-shaped configuration and are positioned with their open sides down astride and aligned along trough with their open sides down astride and aligned along trough 120 in side-by-side relationship. The spaces between adjacent ones of hollow preforms 126 above trough 120 are closed by plugs 128 of suitable material such as plaster of paris. Initially, a parent metal as the first source may be positioned in the hollow portion of each preform 126, and a reservoir of parent metal is positioned within vessel 114. Alternativley, it may be more convenient to pour molten parent metal into resorvoir 114 (or to place a solid parent metal within vessel 114 and then heat the assembly to melt the parent metal) and flow the parent metal from vessel 114 via trough 120 into each of preforms 126. In any case, replenishment of molten parent metal is gravity-flowed from vessel 114 through hole 118 in the bottom thereof (as viewed in FIG. 10), thence into trough 120 and into the hollow interior of preforms 126. The left-hand portion of FIG. 10 shows the molten parent metal within vessel 114, trough 120 and filling the interior of preforms 126. The right-hand portion of FIG. 10, to the right of the vertically disposed irregular dividing line running through the center one of preforms 126, has the molten parent metal omitted therefrom to more clearly show the positioning of the hollow preforms 126 over and along trough 120. Similarly, the right-hand portion of FIG. 11 omits a portion of the center preform and the two to the right of it, as well as their associated plugs 128, to better show the configuration of trough 120 in relation to the preforms. The omitted items are shown in dotted outline in FIG. 11 in which a portion of vessel 114 is also omitted. The static head of molten parent metal within reservoir vessel 114 insures that each of the preforms is kept filled with molten parent metal to replenish the parent metal as it is consumed in the process to form the polycrystalline ceramic matrix which embeds the filler as described above with respect to the other embodiments. When the reaction is completed to the extent that all the preforms are fully infiltrated by the ceramic matrix, the assembly is removed from the furnace, and excess molten metal may be poured from the ceramic composite bodies. Reservoir vessel 114 may itself be replenished with parent metal from time to time, if necessary. Preferably, however, the reservoir vessel will have a sufficient quantity of parent metal to complete the process without intermittent additions of parent metal.

The hollow preforms utilized in the assembly of FIGS. 10 and 11 may be made by any suitable means. One convenient method to make preforms of this shape is slip-casting, which may be carried out by means of an open mold 130 of the type illustrated in cross-sectional view in FIG. 12. Mold 130 is shaped to have a cup-like depression 132 formed therein and mold 130 may be made of any suitable material, such as being cast from plaster of paris. A suitable slip mixture containing fine particulate filler particles is poured into depression 132 to fill it and the slip mixture is allowed to rest for a period of time within the mold. Some of the slip liquid vehicle, typically water, is absorbed into the porous plaster of paris mold and after a suitable period excess liquid is poured out, leaving behind a thick layer of filler material adhering to the interior of cup-like depression 132. The layer may be dried and fired to impart to it sufficient mechanical strength ("green strength") to allow the hollow preform 126 to be withdrawn from the mold 130 as indicated by the unnumbered arrow in FIG. 12. Cup-like depression 132 may be refilled two or more times with the slip-casting mixture after decanting the excess slip to build up a required thickness of the filler material in the mold.

FIG. 13 shows a typical ceramic composite body 126' obtained by utilizing the assembly of FIGS. 10 and 11. Ceramic composite body 126' comprises a ceramic matrix infiltrating the hollow preform 126. Excess parent metal which may remain within ceramic composite body 126', may be removed by mechanical or chemical means to provide a hollow, cup-like ceramic composite body. Of course, bodies 126' may be left partly or fully filled with resolidified molten metal or another material.

FIG. 14 shows a split mold utilizable to form (by the same slip-casting techniques as described with respect to FIG. 12) a hollow preform in the shape of a pump impeller as illustrated in FIGS. 15 and 15A. Referring to FIG. 14, split mold 134 has an upper portion 136 and lower portion 138, each of which is configured so that, with upper portion 136 properly mounted upon lower portion 138, they cooperate to define therebetween a cavity to form a pump impeller-shaped preform 140 (FIGS. 15 and 15A) comprising a disc-shaped body 142 having four curved vanes 144a, 144b, 144c and 144d which terminates in a flange 146a, to the peripheral edge 148 of disc-shaped body 142. Shaft 146 is hollow, having a bore 150 extending therethrough, and disc-shaped body 142 is hollow, defining cavity 152 therein.

The impeller-shaped hollow preform 140 is attained by filling mold 134 (FIG. 14) via its opening 150' with a suitable slip-casting slurry. The slip-casting techniques as described above may be carried out to build up a required thickness of a layer of particulate filler material on the interior cavity of mold 134. After decanting excess liquid, drying and firing the mold containing the coating of slip-cast composition, the result is the hollow preform 140 shown in FIGS. 15 and 15A.

Referring now to FIG. 16, preform 140 is placed within a bed of inert material 154 contained within a refactory vessel 156. A conduit 158 made of a suitable material such as plaster of paris is mounted atop flange 146a and contains therin a reservoir 160 of parent metal. A body of parent metal as first source 162 fills the interior of preform 140. As noted above with respect to other embodiments, parent metal source 162 may be placed within preform 140, for example, by filling the hollow interior thereof with particulate parent metal, or after the assembly is set up, the interior of preform 140 maybe be filled with molten parent metal, which may be supplied to it from a ladle. Similarly, parent metal reservoir 160 may initially be emplaced in the assembly as a solid parent metal reservoir or sufficient molten parent metal may be poured to fill not only the hollow interior of preform 140 but conduit 158, to provide both the first source and reservoir of parent metal in molten form. In any case, the assembly is placed, for example, into a furnace open to an air atmosphere and heated to the required temperature region to form oxidation reaction product and thereby infiltrate preform 140 with the ceramic matrix.

When the reacting is completed, unreacted parent metal filling the ceramic matrix-infiltrated preform 140 may be allowed to resolidify therein. Alternatively, while molten, it may be poured out of the ceramic body. In any case, FIG. 17 shows the resultant ceramic composite body 140' as comprising a disc-shaped body 142' and a shaft 146' terminating in a flange 146a' and having vanes extending radially from the shaft, only vanes 144a' and 144b' being visible in FIG. 17. The interior or ceramic composite body 140' is filled by a material 164 which may be the resolidified parent metal or some other material such as a different metal or ally, or some other material such as a plastic material. In the illustrated embodiment in FIG. 17, a bore 166 has been drilled in the material 164, e.g., resolidified parent metal, with shaft 146', and a key way 168 formed with the bore 166, to facilitate key mounting of the impeller 140' on a shaft. A screw-threaded bore or any other suitable configuration may be formed in the area of bore 166 to provide a suitable arrangement for mounting impeller 140' on a shaft or the like.

Figure 18:
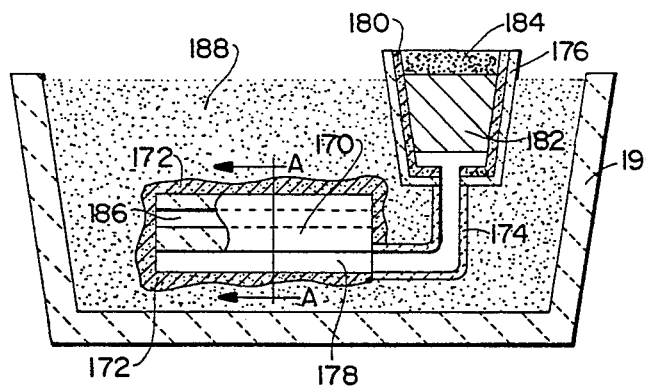
FIG. 18 is a cross-sectional view in elevation showing another assembly of a parent metal reservoir, a preform having a barrier means thereon, and a conduit for molten parent metal, the assembly being emplaced within a retaining bed and contained within a refractory vessel.
Figure 18A:
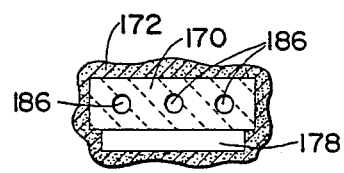
FIG. 18A is a sectional view of the preform taken along line A—A of FIG. 18.

Referring now to FIGS. 18 and 18A, there is shown a preform 170 which is coated with a barrier means 172 comprising a layer of air-permeable plaster of paris. An elbow conduit 174 provides flow communication between a refractory vessel 176 and a void space 178 beneath preform 170, void space 178 being defined and enclosed by a shell of the plaster of paris barrier means 172. Refractory vessel 176 has a plaster of paris lining 180 and contains within it a parent metal reservoir 182, the top of which is covered by a layer of particulate inert material 184. FIG. 18 shows the assembly before parent metal 182 is melted. In an alternate embodiment, void space 178 could be filled with a parent metal source. However, in the illustrated embodiment, upon melting of parent metal 182, molten parent metal flows through conduit 174 and into void space 178, to provide the first source of molten parent metal in contact with preform 170.

Preform 170 has three parallel bores extending therethrough and opening at the opposite faces thereof. The assembly of FIG. 18 is supported within a bed of particulate inert material 188 which is contained within a refractory vessel 190. Upon heating, the molten parent metal flows through conduit 174 and into void space 178, filling the latter and molten parent metal infilatrates preform 170 to be oxidized therein to eventually embed the filler constituents or preform 170 in a ceramic matrix of polycrystalline material. The position of parent metal reservoir 182 maintains a static head of pressure of molten metal keeping space 178 filled with a first source of parent metal throughout the entire oxidation process to help insure that preform 170 is completely and uniformly filled with the resultant ceramic matrix.

Figure 19:
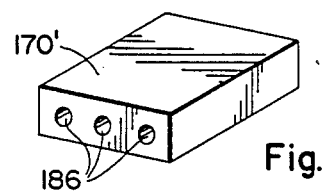
FIG. 19 is a perspective view of a self-supporting ceramic composite structure made by using the assembly of FIG. 16 in accordance with the present invention.

As indicated above with respect to other embodiments, more than one parent metal reservoir 182 may be employed to flow molten parent metal into space 178.

upon completion of the reaction and allowing the assembly to cool, the resultant ceramic composite structure is removed from the bed of inert material 188 and the plaster of paris barrier means 172 is broken away to free ceramic composite structure 170' (FIG. 19) having three parallel bores 186 extending therethrough. By maintaining oxidation reaction conditions within preform 170 which are more favorable than those outside the preform, bores 186 are kept substantially free of polycrystalline matrix material. In this context, the spaces comprising bores 186 are "outside" the material of which preform 170 is made.

In any of the embodiments of the invention, the composition of the material of the preform (or other form of filler) may include one or more suitable dopants or oxidants or may otherwise provide conditions in which the kinetics of oxidation of the parent metal are more favorable than they are in the absence of the filler material. Therefore, depending upon specific dopants, oxidants, parent metal and temperature conditions, the polycrystalline material comprised of the oxidation reaction product can be caused, under such circumstances, to grow outside the filler. Thus, in the embodiment illustrated in FIG. 18 and 18A, the polycrystalline material will not form or grow to fill bores 186. Alternatvely, or in addition, a barrier means may be provided within bores 186 to prevent growth of the polycrystalline matrix material therein, a technique which is illustrated with respect to the embodiment of FIGS. 20-21.

Figure 20:
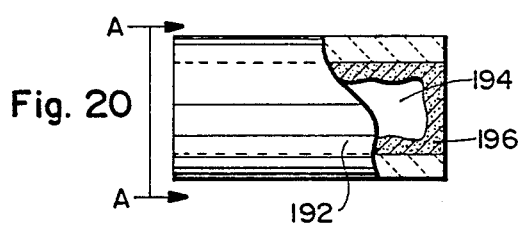
FIG. 20 is a partially cross-sectional view in elevation of a preform having a central bore which is lined with a barrier means.
Figure 20A:
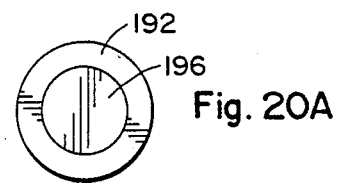
FIG. 20A is an end view taken along line A—A of FIG. 20.
Figure 21:
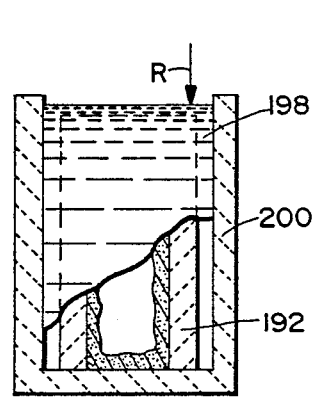
FIG. 21 is a cross-sectional view in elevation showing an assembly of the preform of FIG. 20 immersed in molten parent metal contained within a refractory vessel.
Figure 21A:
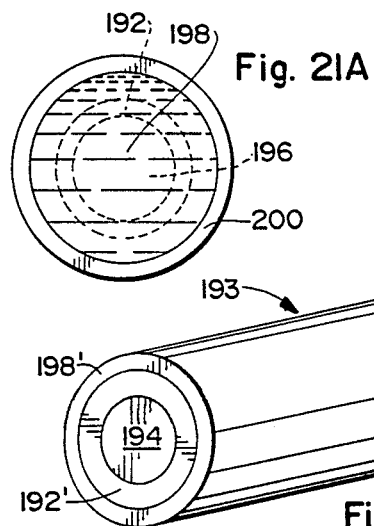
FIG. 21A is a top plan view of the assembly of FIG. 21.

Referring now to FIGS. 20-21A, there is shown a preform 192 which is of circular cylindrical configuration (as best seen in FIG. 20A) and has a central bore 194 extending therethrough and opening at each of its opposite ends. Central bore 194 is line with a barrier means 196 comprising a layer of plaster of paris coating the interior of central bore 194 and stoppering both open ends thereof. Central bore 194 could also be entirely filled with a plug of barrier material.

FIG. 21 shows an assembly of preform 192 centered vertically within a body of molten parent metal 198 contained within a cylindrical refractory vessel 200. Preform 192 is of shape congruent to the interior of vessel 200 but of narrower diameter. One end of preform 192 may rest on the bottom of vessel 200, as illustrated, or it may be supported on shims to provide a small clearance for access of molten parent metal to the bottom of preform 192. Refractory vessel 200 is sized to receive preform 192 therein with sufficient annular space between preform 192 and the interior walls of vessel 200 to permit contacting the entire outer surface of preform 192 with a body of molten parent metal of uniform annular thickness. In order to maintain preform 192 submerged at all times within the body of molten parent metal 198 replenishment molten parent metal from a reservoir (not shown in FIGS. 21 or 21A) is supplied on a continuous or intermittent basis as indicated by the arrow R in FIG. 21. Thus, vessel 200 may be supplied from a tip ladle or from a reservoir introducing the molten parent metal by a conduit or other suitable means into refractory vessel 200. Alternatively, solid parent metal, say in particulate form, may be added as required to the body of molten parent metal 198 for melting in situ to replenish the supply of parent metal. In this embodiment, it is seen that the growth of polycrystalline ceramic matrix material to infiltrate preform 192 with the matrix takes place form the entire outer surface of preform 192 towards central bore 194 thereof. A smooth surface of central bore 194 is assured by the provision of the barrier meand 196 therein. As with the prior embodiments, replenishment from a reservoir of molten parent metal assures that the entire preform 192 is maintained submerged in the molten parent metal to provide uniform growth of the polycrystalline matrix material therethrough.

Refractory vessel 200 may be sized relative to preform 192 so that the reservoir of parent metal is provided in the form of a sufficient depth of molten parent metal above preform 192 such that, upon completion of the process, the preform 192 is still entirely submerged within molten parent metal. Thus, the reservoir and first source of parent metal may comprise the single body of molten parent metal 198 provided it is large enough to maintain the preform entirely submerged within the molten metal throughout the entire oxidation reaction process.

Upon completion of the process, the ceramic product is removed from the molten parent metal bath and excess molten parent metal is allowed to drain therefrom. The core as barrier means 196 is removed and the result is a ceramic composite structure 193 of cylindrical configuration comprising a ceramic lining 192' having a central bore 194 extending along its longitudinal axis and integral with a parent metal substrate 198'.

Figure 22:
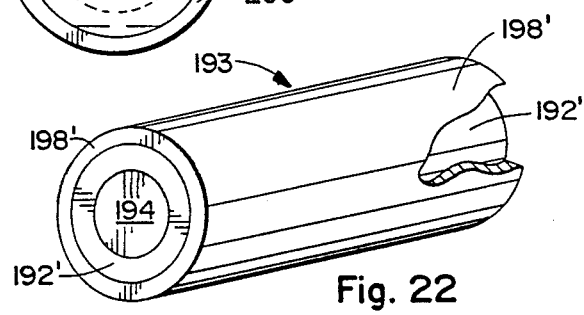
FIG. 22 is a perspective view of a self-supporting ceramic-surfaced metal structure made by using the assembly of FIG. 21 in accordance with the present invention.

Structures in accordance with the present invention, such as those illustrated, for example, in FIG. 6 (if resolidified parent metal is retained in bore 80), FIG. 17 and FIG. 22 have a ceramic surface which is integrally formed on, and typically bonded to, a body of metal. The ceramic surface comprises a matrix of the polycrystalline material obtained by oxidation reaction of the parent metal and embedding a filler. Such integral ceramic-surfaced metal structures provide significant advantage over conventional ceramic structures, inlcuding increased resisitance to catastrophic failure and, in certain cases, lighter weight. For example, the outer ceramic surface of the pump impeller of FIG. 17 enables it to be used in services (such as pumping corrosive and/or erosive fluids) which require a ceramic surface, and because of its bond to the ceramic surface, its metal core or substrate provides resistance to catastrophic failure to the impeller normally lacking in conventional ceramic structrures. Thus, a stress crack or mechanical impact which would tend to shatter a conventional ceramic structure, resulting in catastrophic failure of the part, but structure of this invention sustain their integrity. For example, even if a mechanical impact of the impeller of FIG. 17 were sufficient to damage or crack the ceramic surface of impeller 140', the metal body would maintain structural integrity of the part. the structure of the invention also overcomes the long-standing difficulties inherent in attaching a ceramic part, such as a pump impeller, to a high strength metal member such as a steel driveshaft. with prior ceramic bodies, localized mechanical stresses imposed on the brittel ceramic part at any interface with a ductile component often resutled in shattering the friable ceramic material. The ceramic-surfaced metal substrate structure of the present invention provides the ability to make a metal-to-metal connection (e.g., a metal shaft keyed to bore 166 in FIG. 17) to a ceramic member. The ability to avoid catastrophic failure is an especially significant issue in the design of rotating, reciprocating and pressurized components.

A further feature of the present invention is that by choosing appropriate parent metal, filler, and oxidant, the resulting ceramic-surfaced metal component can be produced with a favorable prestress built into the ceramic surface and the metal interface, causing the ceramic composite article to exhibit superior apparent strength and damage resistance. This is accomplished by choosing materials and process conditions which create a controlled differential shrinkage between the ceramic surface and metallic substrate. A prestress is made possible by the exceptionally good bond of ceramic surface and substrate.

Figure 23:
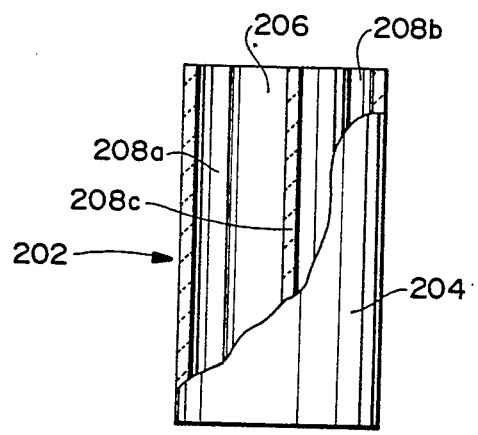
FIG. 23 is a partial cross-sectional elevation view of another preform useable in the present invention.
Figure 24:
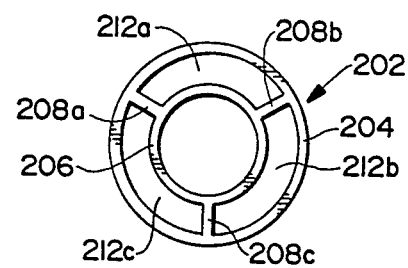
FIG. 24 is a plan view of the preform of FIG. 23.

Referring now to FIGS. 23 and 24, there is shown a preform 202 comprising an outer cylindrical shell 204 and an inner cylindrical shell 206 of lesser diameter than shell 204 but equal thereto in length. The outer and inner shells are connected by three webs 208a, 208b, 208c, which are coextensive in length with shells 204 and 206. Preform 202 thus comprises a unitary structure. Webs 208a, 208b and 208c are equiangularly spaced-apart about the peripheries of shells 204 nad 206, i.e., the three webs and angularly spaced-apart 120 degrees, as viewed in FIG. 24. As best seen in FIG. 24, the structure divides the interior of preform 202 into a longitudinally extending central bore 210 and three longitudinally extending annular compartments 212a, 212b and 212c.

The preform 202 may be infiltrated with polycrystalline material obtained by oxidation of molten parent metal introduced into bore 210 and compartments 212a, 212b and 212c. In addition, the exterior surface of outer shell 204 may also be immersed in molten parent metal as may be attained by a lay-up of prefrom 202 similar to that illustrated in FIG. 21 with respect to preform 192. Further, if desired, one or more of bore 210, compartments 212a, 212b and 212c may be left with resolidified parent metal therein to provide a ceramic-lined metal substrate structure. Alternatively, or in addition, a substrate of resolidified parent metal (corresponding to metal substrate 198' of FIG. 22) may be left about the exterior surface of outer cylindinder 204.

The ceramic composite structures provided by the present invention comprise, as noted above, a ceramic matrix embedding a filler, which may be provide as a bed of conformable filler, or as a shaped preform. Suitable fillers include those chemical species which, under the temperature and oxidizing conditions of the process, are not volatile, are thermodynamically stable, and do not react with or dissolve excessively in the molten parent metal. Numerous materials are known to those skilled in the art as meeting such criteria in the case where aluminun parent metal and air or oxygen as the oxidant is employed. Such materials include the metal oxides, borides or carbides, such as aluminum, silicon, hafnium and zirconium, and may be in any desirable form or size.

The dopant or dopants used in conjuction with the parent metal (1) may be provided as alloying constituents of the parent metal, (2) may be applied to at least a portion of the surface of the parent metal source body, or (3) may be applied to or incorporated into part or all of the filler material or preform, or any combination of two or more techniques (1) , (2) and (3) may by employed. For example, an alloyed dopant may be used solely or in combination with a second, externally applied dopant. In the case of technique (3), where additional dopant or dopants are applied to the filler material, the application may be accomplished in any suitable manner as explained in the Commonly Owned Patent Applications.

Dopant useful for an aluminum parent metal, particularly with air as the oxidant, include magnesium, zinc, and silicon, which may be in combination with other dopants as described below. These metals, or a suitable source of the metals, may be alloyed into the aluminum-based parent metal at concentrations for each of between about 0.1–10% by weight based on the total weight of the resulting doped metal. These dopant materials or a suitable source thereof, e.g., MgO, ZnO, or $SiO_2$, may be used externally to the parent metal. Thus an alumina ceramic structure is achieveable for an aluminum-silicon alloy as the parent metal using air as the oxidant by using MgO as a surface dopant in an amount greater than about 0.0008 gram per gram of parent metal to be oxidized and greater than about 0.003 gram per square centimeter of parent metal surface upon which the MgO is applied.

Additional examples of dopant materials effective with aluminum parent metals oxidized with air include sodium, germanium, tin, lead, lithium, calcium, boron, phosphorus and yttrium whihc may be used individually or in combination with one or more dopants depending on the oxidant and process conditions. Rare earth elements such as cerium, lanthanum, praseodymium, noedymium and samarium are also useful dopants, and herein again especially when used in combination with other dopants. All of the dopant materials, as explained in the Commonly Owned U.S. Patent Applications, are effective in promoting polycrystalline oxidation reaction product growth for the aluminum-based parent metal systems.

The ceramic composite structure obtained by the practice of the present invention will usually be a dense, coherent mass wherein between about 5% and about 98% by volume of the total volume of the composite structure is comprised of one or more of the filler components embedded within a polycrystalline matrix material. The polycrystalline matrix material is usually comprised of, when the parent metal is aluminum, about 60% to about 99% by weight (of the weight of polycrystalline material) of interconnected alpha-aluminum oxide and about 1% to 40% by weight (same basis) of non-oxidized constituents of the parent metal.

The intimate bond which typically occurs on cooling between an appropriately-selected parent metal and the ceramic surface which can be created thereon by the process of the present invention allows wear resistant material to be applied to a ductile member and renders feasible, for example, ceramic surfaces to ductile pressure shells. The high strenght bond of ceramic surface to metal substrate in the present invention appears to owe its existence to the intense wetting of parent metal to its oxidation reaction product which very feature also permits the parent metal to transport through such reaction product to grow the matrix of the present invention.

The products of the present invention, because of their economy, light weight, prestressed condition, bond of ceramic surface of metal substrate, shape versatility, size versatility, resistance to catastrophic failure, wear resistance, strength, high temperature resistance, or corrosion resistance, are idally suited for use as use as heat engine components, valve components, and pump components.

The idea of a ceramic coating on metal is not new. While conceptually a very attractive concept, prior means of achieving such components have been extremely limited in vitability because of the inability to create such a ceramic surface to sufficient depth, without spalling, retaining sufficient adhesion to the metal substrate, destributed over complex surfaces and at reasonable cost. The present invention is completely unique in its ability to make ceramic composite surfaces of almost any configuration and thickness and to form them bonded integrally to commodity-purity structural parent metals in a low-cost, moderate temperature, unpressurized process.

The invention is further illustrated by the following non-limiting examples.

EXAMPLE 1

In order to prepare a ceramic composite structure a Schedule 40 tube (1 15/16 inches outside diameter) of a commerically available 601 metal alloy sold under the trademark INCONEL to 18 of FIG. 1) 6 inches in length was perforeted with a plurality of holes each 3/16 inch in diameter. The holes were drilled over the entire cylindrical body of the tube on ⅜ inch centers in a staggered row pattern. A 304 alloy stainless steel perforated sheet approximately 0.008 inch in thickness with 0.016 inch diameter holes was used as an interior liner (corresponding to 16 of FIG. 1) for the drilled 601 metal alloy tube. The holes provided a 22 percent open area sheet. The perforated stainless steel was chosen to serve as a barrier to matrix growth for the present Example.

A parent metal member comprised of an aluminum alloy containing 10 percent silicon and 3 percent magnesium comprised a parent metal source body and a parent metal reservoir somewhat similar in configuration to those illustrated in FIG. 1. However, in this case, the reservoir (corresponding to 34 of FIG. 1) was of non-tapered, cylindrical configuration 2½ inches in diameter and 2 inches high and the source body (corresponding to 36 of FIG. 1) was ¾ of an inch in diameter and 6 inches in length, and was joined at its upper end to the reservoir portion. The source body had a screw thread configuration and was embedded within a mass of filler (corresponding to the mass of conformable filler 38 in FIGS. 1 and 1A) of a mixture of 5 percent by weight commercial sand (silica) and 95 percent ALUNDUM, a particulate alumina supplied by Norton Company and sold under the trademark 38 ALUNDUM. The filler mixture was heated to about 1250° C. for 24 hours, then allowed to cool to ambient temperature. The cooled mixture was then milled and emplaced within the stainless steel-lined perforated Schedule 40 INCONEL TM tube. The parent metal source body was coated with a layer of wood glue (sold under the trademark ELMER'S by Bordon Company) and sand. The reservoir was embedded within a bed of 90 grit, 38 ALUNDUM TM contained within a 304 alloy stainless steel chamber (corresponding to 12 in FIG. 1) and had a 2-inch diameter hole on its floor (shown unnumbered in FIG. 1). The top of the INCONEL TM tube was welded to the periphery of the 2-inch hole.

In order to support the resultant assembly in an upright position, the INCONEL TM tube portion thereof (corresponding to 14 in FIG. 1) was placed within a perforated 304 alloy stainless steel support cylinder of 3½ inches inside diameter and perforated with 3/32 inch diameter holes drilled to provide 40 percent open area of the support cylinder. The support cylinder was of a length to support the reservoir chamber (corresponding to 12 in FIG. 1) at the top of the support cylinder. This arrangement maintained the parent metal and filler assembly in a vertical position with the reservoir directly vertically above the source body. The resultant supported assembly was placed on a refractory, open container and heated in a furnace having an air atmosphere for 10 hours, at a temperature of 1245° C., was maintained at 1245° C. for 100 hours, and then cooled over a 30 hour period to 125° C., thereafter allowed to cool to ambient temperature. A ceramic composite body had grown within the encasement of the Schedule 40 INCONEL ™ stainless steel cylinder and embedded the mass of filler. Upon cooling, the INCONEL ™ encasement was found to be fitted about the ceramic composite body. Upon removal of resolidified parent metal from the bore of the ceramic structure by drilling and chemical (hydrochloride acid) treatment, a bore extending therethrough was exposed which inversely replicated the screw thread configuration of the original source body. The wall thickness of the ceramic body of apporximatly ⅛ inch was much thicker than could have been produced by the source body had the reservoir body not been attached.

The following Tables are referred to in describing the Examples of the present invention.

TABLE A (A) A slip-casting composition for use in plaster of paris mold,s as described below, can be prepared by mixing the following ingredients in the indicated proportion:

| Parts by weight | |
|---|---|
| 47.6 | 100 grit E67 alumina (Norton Co.) |
| 23.6 | EPK kaolin clay |
| 28.5 | water |
| 0.1 | dispersant sold under the trademark VEE-GUM CER ™ |
| 0.2 | dispersant sold under the trademark DARMAN-7 ™ |

The VEE-GUM CER ™ and DARVAN-7 ™ are dispersant for the kaolin clay.

(B) A sedimentation casting composition can be prepared by mixing an aqueous binder comprising 10 parts by volume water and one part by volume of a latex-base adhesive (carpenter's glue) sold under the trademark ELMER'S by Bordon Company. The aqueous binder is then mixed with selected filler particles in proportions to give a desired consistency to the resulting slurry.

(C) RTV silicon rubber molds were prepared by coating a part with the liquied rubber composition, allowing the rubber to set and then removing the rubber mold from the article.

TABLE B

Aluminum Parent Metal Alloy Composition

5% Silicon
4% Copper
1% Magnesium
4% Zinc
1% Iron
Balance aluminum

TABLE C

Aluminum Parent Metal Alloy Composition (Nominal)

3.7% Zinc
3.9% Copper
1.1% Iron
8.3% Silicon
0.19% Magnesium
0.04% Nickel
0.02% Tin
0.04% Chromium
0.20% Manganese
0.08% Titanium
Balance aluminum

EXAMPLE 2

A preform of the shape of preform 44 of FIG. 3 was sedimentation cast in a rubber mold prepared, as described in Table A, step (C), from a miniature piston. The sediment casting composition employed the aqueous binder of Table A, step (B) with the following fillers:

| Parts by weight | |
|---|---|
| 93 | 38 Alundum (70 by weight 220 grit, 50 by weight 500 grit) |
| 7 | silicon metal (50 by weight 220 grit, 30 by weight 500 grit) |

Excess binder was decanted from the mold and the mold was frozen to enable removal of the cast filler, which was then allowed to dry. The dried filler was pre-fired at 1300° C. in air for three hours. The resultant permeable preform was coated on the surfaces of its hollow body portion (44c in FIG. 3) with a nickel powder slurry. The outside of the preform was coated with a layer of air-permeable plaster of paris. An aluminum parent metal body whose composition was substantially that shown in Table B was placed with the preform in a lay-up as shown in FIG. 3 and fired in an air atmosphere at 1000° C. for 40 hours. Excess molten aluminum was decanted from the resultant ceramic composite structure which was an accurately dimensioned ceramic composite miniature piston.

EXAMPLE 3

A permeable preform of the shape of preform 56 in FIG. 5 was prepared by the technique of Table A, steps (B) and (C), using the same sedimentation casting composition except that only 5 parts by weight of the silicon metal powder was used. The preform was coated on its outer surface with two thin layers of air-permeable plaster of paris barrier material and the same aluminum alloy as in Table C was provided as the parent metal in a vessel (58 in FIG. 5). The lay-up was heated in an air atmosphere for 68 hours at 1000° C. and the resultant ceramic composite structure showed accurate dimensions and complete infiltration of the preform by the ceramic matrix.

EXAMPLE 4

Five permeable preforms of the shape shown for preforms 126 in FIGS. 10, 11 and 12 were prepared by using the sedimentation casting technique of Table A.

A lay-up as illustrated in FIGS. 11 and 12 was prepared. Plaster of paris plugs 128 were applied over stiff paper bridges laid across trough 120 in the gaps between preforms 126. The outside surface of each preform 126 was coated with a plaster of paris barrier material layer. Within the vessel 114 a body of aluminum alloy composition as per Table C was placed and the lay-up was heated in air at 1000° C. As the aluminum alloy melted, it flowed through trough 120 and upwardly into each of preforms 126, slowly filling the preforms to the top as air was expelled through the porous preforms. The temperature was maintained for 50 hours, after which the lay-up was dissassembled and molten parent aluminum was decanted from the resultant ceramic composite crucibles, acid and/or sand blasting being used to remove solidified excess aluminum alloy from the interior of the ceramic composite crucibles.

EXAMPLE 5

The slip-casting technique of Table A, step (A) was used to prepare, in a plaster of paris mold similar to that illustrated in FIG. 14, a permeable preform as illustrated in FIGS. 15 and 15A. The slip-cast preform was dried and pre-fired at 700° C. for thirty minutes. The outside of the preform was coated with a mixture (dry basis) of 70% by weight plaster of paris and 30% by weight $SiO_2$ to serve as a barrier material. The interior of the preform was cooled with a slurry of silicon metal powder and then the preform was filled with molten aluminum alloy composition, as per Table C. The lay-up was heated at 900° C. for 96 hours with continuous replenishment of the aluminum alloy to keep the preform completely filled with molten aluminum alloy. After removal from the furnace and cooling, a metal-filled, ceramic composite-lined pump impeller of accurate dimensions was obtained.

The ceramic surface on the metal substrate of the pump impeller of Example 5 was typical of the ceramic-surfaced metal substrates produced in accordance with the invention, in that it showed a tight, integral adherence between the solidified parent metal and the ceramic surface integrally formed therefrom. The parts so produced in the Example above had tough surfaces of ceramic matrices embedding a filler tightly adhered to alloy aluminum substrate so that the parts had the mechanical toughness and resiliency of the aluminum alloy and a facing or a core of hard ceramic surface.

Although only a few exemplary embodiments of the invention have been descirbved in detail above, those skilled in the art will readily appreciate that the present invention embraces many combinations and variations other than those exemplified.

What is claimed is:

1. A method for producing a self-supporting ceramic composite structure comprising a ceramic matrix obtained by an oxidation reaction of a parent metal with an oxidant to form a polycrystalline material, the method comprising:

(a) orienting a first source of parent metal and a permeable mass of filler material relative to each other so that formation of an oxidation reaction product of the first source of parent metal will occur in a direction towards and into said mass of filler, wherein the quantity of said first source of parent metal provided is insufficient to embed substantially completely said permeable mass;

(b) heating said first source of parent metal to temperature region above its melting point but below the melting point of its oxidation reaction product to form a body of molten parent metal from said first source and reacting said first source of molten parent metal with an oxidant to form said oxidation reaction product by maintaining at least a portion of said oxidation raction product in contact with and extending between said first source of molten parent metal and said oxidant to progressively draw molten parent metal through the oxidation reaction product towards the oxidant and into said mass of filler so that fresh oxidation reaction product continues to form within said mass of filler at an interface between said oxidant and previously formed oxidation reaction product; and (c) providing additional molten parent metal from a second source of parent metal which contacts said first source, wherein said second source of parent metal comprises a reservoir of parent metal such that said second source of parent metal at least partially replenishes said first source of molten parent metal as said reacting continues such that said permeable mass is substantially completely embedded to form said self-supporting ceramic composite structure.

2. The method of claim 1, wherein said replenishing comprises flowing molten parent metal from said reservoir source to said first source by gravity flow communication.

3. The method of claim 1, wherein said first source is provided by flowing a portion of molten parent metal from said reservoir source into contact with said mass of filler material, and thereafter continuing the flow of molten parent metal from said reservoir source to effect said at least partial replenishing.

4. The method of claim 1, wherein said first source of parent metal comprises a solid ingot of parent metal prior to said heating stop, said solid ingot of parent metal being placed in physical contact with said mass of filler, and after said heating to result in said body of molten parent metal from said first source, said reservoir source of molten parent metal communicates with said body of molten parent metal to effect said at least partial replenishing.

5. The method of claim 3 or 4, wherein said at least partial replenishing occurs by gravity flow communication.

6. The method of claim 1 or claim 2, wherein said first source of parent metal comprises a solid ingot of parent metal having a pattern formed thereon, and said mass of filler material comprises a filler which is in conforming engagement with said pattern, whereby after said reacting is completed by infiltrating the filler material to a desired amount to form said self-supporting ceramic composite structure, any excess parent metal which did not form oxidation reaction product is removed from said filler material and said self-supporting ceramic composite structure contains an inversely replicated geometry of said pattern therein.

7. The method of claim 1 or claim 2, wherein said mass of filler material comprises at least one shaped preform.

8. The method of claim 7, wherein at least a portion of a surface of said perform is defined by a barrier means.

9. The method of claim 1 or claim 2, further comprising a barrier means at least partially spaced from said first source of parent metal for establishing at least one surface of said mass of filler material, whereby said reacting occurs until said oxidation reaction product confronts said barrier means, thereby producing a ceramic composite structure having an exterior surface established by said barrier means.

10. The method of claim 1 or claim 2, wherein said mass of filler material comprises a hollow body, and said orienting is effected such that said first source of molten parent metal contacts with at least one wall of said hollow body whereby infiltration of said oxidation reaction product proceeds from or along said at least one wall.

11. The method of claim 1 or claim 2, further comprising maintaining said reservoir source of molten parent metal at an elevation at or above the highest elevation of said body of molten parent metal from said first source to maintain a static pressure head on said body of molten parent metal from said first source.

12. The method of claim 3, wherein said mass of filler material comprising a plurality of masses of filler material each of said plurality of masses of filler material contacting said molten parent metal.

13. The method of claim 1 or claim 2, further comprising maintaining molten parent metal in contact with said mass of filler material and after said reacting is comptleted, permitting unreacted metal to solidify in contact with said self-supporting ceramic composite structure so as to provide a metal substrate integrally formed therewith.

14. The method of claim 13, wherein said mass of filler material comprises at least one cavity formed therein, said at least one cavity communicating with said molten parent metal and said unreacted molten parent metal present in said at least one cavity is permitted to solidify to provide said metal substrate as an interior substrate having an outer surface of ceramic composite.

15. The method of claim 13, wherein said ceramic composite has a volume which is less than a volume of said metal substrate which is integrally formed therewith.

16. The method of claim 13, wherein said ceramic composite structure has a volume which is greater than a volume of said metal substrate which is integrally formed therewith.

17. The method of claim 1 or claim 2, wherein a volume of said first source of molten parent metal with which said oxidation reaction product is maintained in contact in step (b) is sufficiently less than a pore volume in said mass of filler material to be infiltrated by said oxidation reaction product formed from said first source, and that replenishing of said first source from said reservoir source is used in forming said oxidation reaction product throughout substantially the entire pore volume of said mass of filler material.

18. The method of claim 1 or claim 2, wherein said parent metal comprises an aluminum parent metal.

19. The method of claim 18, wherein said oxidant comprises air, said temperature region is from about 850° C. to about 1450° C., and said oxidation reaction product comprises alumina.

20. The method of claim 19, further comprising defining at least a first boundary of said mass of filler material with a barrier means.

21. The method of claim 1 or claim 2, further comprising using at least one dopant material in conjunction with said parent metal.

22. The method of claim 7, wherein said at least one preform comprises a plurality of preforms, each of said pluarlity of preforms contacting molten parent metal.

23. the method of claim 7, wherein said parent metal comprises an aluminum parent metal.

24. The method of claim 7, wherein said parent metal comprises a metal selected from the group consisting of titanium, silicon, zirconium, hafnium and tin.

25. The method of claim 1 or claim 2, wherein said parent metal comprises a metal selected from the group consisting of titanium, silicon, zirconium, hafnium and tin.

26. The method of claim 21, wherein said parent metal comprises aluminum, said oxidant comprises oxygen, and said barrier means comprises at least one material selected from the group consisting of stainless steel, plaster of paris, calcium silicate, calcuim sulfate, wollastonite and portland cement.

27. A method for producing a self-supporting ceramic composite structure comprising a ceramic matrix obtained by an oxidation reaction of a parent metal with an oxidant to form a polycrystalline material, the method comprising:

(a) orienting (i) a first source of parent metal comprising a solid ingot of parent metal and (ii) a permeable mass of filler material relative to each other so that formation of an oxidation reaction product of the first source of parent metal will occur in a direction towards and into said mass of filler material, wherein the quantity of said first source of parent metal provided is insufficient to embed substantially completely said permeable mass;

(b) providing a second source of parent metal comprising a reservoir;

(c) heating said first source of parent metal to a temperature region above its melting point but below the melting point of its oxidation reaction product to form a body of first source of molten parent metal and reacting said body of first source of molten parent metal with an oxidant to form said oxidation reaction product by maintaining at least a portion of said oxidation reaction product in contact with and extending between said body of first source of molten parent metal and said oxidant to progressively draw molten parent metal through the oxidation reaction product towards the oxidant and into said mass of filler material so that fresh oxidation reaction product continues to form within said mass of filler material at an interface between said oxidant and previously formed oxidation reaction product;

(d) heating said reservoir source of parent metal to cause it to be molten; and (e) contacting said reservoir of molten parent metal with said body of first source of molten parent metal such that said molten reservoir of parent metal communicates with said body of first source of molten parent metal to at least partially replenish said body of first source of molten parent metal as said reacting continues, thereby forming said self-supporting ceramic composite structure.

* * * * *